US010732608B2

United States Patent
Janssen et al.

(10) Patent No.: US 10,732,608 B2
(45) Date of Patent: Aug. 4, 2020

(54) TRANSLATION MODULE, PROCESSING MODULE AND CONTROL SYSTEM

(71) Applicant: BECKHOFF AUTOMATION GMBH, Verl (DE)

(72) Inventors: Dirk Janssen, Verl (DE); Klaus Bernzen, Gütersloh (DE); Ralph Dreesen, Gütersloh (DE)

(73) Assignee: Beckhoff Automation GmbH, Verl (DE)

( * ) Notice: Subject to any disclaimer, the term of this patent is extended or adjusted under 35 U.S.C. 154(b) by 204 days.

(21) Appl. No.: 15/727,357

(22) Filed: Oct. 6, 2017

(65) Prior Publication Data

US 2018/0032055 A1 Feb. 1, 2018

Related U.S. Application Data

(63) Continuation of application No. PCT/EP2016/057747, filed on Apr. 8, 2016.

(30) Foreign Application Priority Data

Apr. 9, 2015 (DE) .................. 10 2015 105 436

(51) Int. Cl.
*G05B 19/408* (2006.01)
*G06F 8/41* (2018.01)
*G06F 9/50* (2006.01)

(52) U.S. Cl.
CPC .......... *G05B 19/408* (2013.01); *G06F 8/427* (2013.01); *G06F 8/436* (2013.01); *G06F 9/5016* (2013.01);
(Continued)

(58) Field of Classification Search
CPC ........ G06F 17/2872; G06F 8/41; G06F 8/427; G06F 8/436; G06F 9/5016; G05B 19/408;
(Continued)

(56) References Cited

U.S. PATENT DOCUMENTS 4,797,811 A * 1/1989 Kiyokawa ........ G05B 19/40936
700/181
5,227,978 A * 7/1993 Kato .................... G05B 19/408
318/573
(Continued)

FOREIGN PATENT DOCUMENTS

CN 101763280 A 6/2010
CN 101957745 A 1/2011
(Continued)

OTHER PUBLICATIONS

German Office Action for German Patent Application No. 102015105436.1, dated Jan. 28, 2016 (13 pages), with English Translation.
(Continued)

*Primary Examiner* — Marina Lee
(74) *Attorney, Agent, or Firm* — Dorsey & Whitney LLP

(57) ABSTRACT

A transmission module for a machine control is designed to process an input program code of a control program, and based thereon, to generate a uniform intermediate code having work instructions for execution by the machine control. The input program code comprises a first program code component and a second program code component, where the first program code component is written in a first programming language and the second program code component is written in a second programming language. The work instructions of the intermediate code comprise a first work instruction and a second work instruction, where the first work instruction is generated on the basis of the first program code component and the second work instruction is generated on the basis of the second program code component.

20 Claims, 4 Drawing Sheets

(52) U.S. Cl.
CPC .............. *G05B 2219/36031* (2013.01); *G05B 2219/36186* (2013.01)

(58) Field of Classification Search
CPC ........... G05B 2219/13067; G05B 2219/13119; G05B 2219/36031; G05B 2219/36186
USPC .................................................. 717/136–167
See application file for complete search history.

(56) References Cited

U.S. PATENT DOCUMENTS

| | | | |
|---|---|---|---|
| 5,485,620 A | 1/1996 | Sadre et al. | |
| 6,467,082 B1* | 10/2002 | D'Arcy | G06F 9/455 717/127 |
| 6,588,008 B1* | 7/2003 | Heddes | G06F 8/47 712/1 |
| 6,836,883 B1* | 12/2004 | Abrams | G06F 8/47 717/140 |
| 9,424,003 B1* | 8/2016 | Neumann | G06F 8/30 |
| 2007/0005178 A1 | 1/2007 | Prestige et al. | |
| 2008/0263039 A1* | 10/2008 | Van Lunteren | G06F 16/90344 |
| 2009/0013128 A1* | 1/2009 | Peterson | G06F 9/449 711/113 |
| 2010/0268358 A1* | 10/2010 | Cantarelli | G05B 19/05 700/86 |
| 2012/0260239 A1* | 10/2012 | Martinez Canedo | G05B 19/05 717/149 |
| 2015/0026659 A1* | 1/2015 | Ding | G05B 19/042 717/109 |
| 2015/0128114 A1* | 5/2015 | O'Hara | G06F 8/71 717/143 |
| 2018/0011474 A1* | 1/2018 | Brinkhaus | G05B 19/4065 |
| 2018/0032055 A1* | 2/2018 | Janssen | G05B 19/408 |

FOREIGN PATENT DOCUMENTS

| | | |
|---|---|---|
| CN | 103460150 A | 12/2013 |
| DE | 4342660 A1 | 6/1995 |
| FR | 2826746 A1 | 1/2003 |
| WO | 2016162477 A1 | 10/2016 |

OTHER PUBLICATIONS

Manfred Weck, "Werkzeugmasch inen Fertigungssysteme 4 / Automatisierung von Maschinen und Anlagen," Springer-Verlag (New York), 2001.

Author Unknown, "Compiler," Wikipedia, Feb. 2, 2015, pp. 1-8, vol. 23, No. 22, accessed on Jan. 18, 2016 via website, http://de.wikipedia.org/w/index.php.

State Intellectual Property Office Peoples Republic of China "Notification of First Examination form CN Application No. 201680033251.7", dated Aug. 15, 2019, "from Foreign Counterpart of U.S. Appl. No. 15/727,357", pp. 1-11, Published in: CN.

* cited by examiner

TRANSLATION MODULE, PROCESSING MODULE AND CONTROL SYSTEM

CROSS-REFERENCE TO RELATED APPLICATIONS

This application is a continuation of International Patent Application No. PCT/EP2016/057747, filed Apr. 8, 2016, which claims priority to German Patent Application No. 10 2015 105 436.1, filed Apr. 9, 2015; the entireties of which are hereby incorporated by reference for all purposes.

BACKGROUND

The present invention relates to a translation module for a machine control, a processing module for a machine control and a control system for controlling a machine.

Control systems having machine controls are used in automation engineering, inter alia. For motion control, this involves primarily machine controls being implemented that are configured as numerical controls (NC) or computerized numerical controls (CNC). A machine control configured as an NC or CNC control typically reads in information about the movements of the machine that are to be executed from a control program and uses this information to produce setpoint values for position controllers of the machine, wherein the position controllers control the position and movements of the machine components. Typically, the setpoint values are produced and output cyclically with a fixed cycle time.

NC controls are typically programmed by means of an imperative programming language, wherein a loaded control program is executed once after starting at runtime. A prevalent programming language for programming machine controls configured as NC controls is the language G code, as described in the industrial standard ISO 6983. G code allows a movement that is to be executed by the machine to be defined by means of geometric elements such as continuous lines or circle segments. A disadvantage of standard-compliant G code, however, is the limited scope of language thereof for available geometric elements and the large absence of high-level language elements. As such, named variables, progressive control flow instructions such as multiple case distinctions, and named and/or parameterized functions cannot be used or can be used only to a limited extent. Native and user-defined data types, such as multidimensional arrays, pointers, structures, lists and character strings are not available. The programming paradigm of object-oriented programming cannot be applied.

Beside NC controls for position control, programmable logic controllers (PLC) are also used in automation engineering. Programmable logic controllers are used in process control engineering, inter alia, for example for controlling production lines or chemical installations. Machine controls configured as programmable logic controllers control or regulate machines and installations by virtue of actuators such as relays, drives or valves being controlled on the basis of measured values that have been captured by sensors arranged on the machine or the installation.

Programmable logic controllers normally operate on an event-controlled basis and execute a control program periodically. Within an execution cycle, the signals of the sensors are then read in and the signals are taken as a basis for computing and outputting output values for the actuators. Programming languages for machine controls configured as programmable logic controllers are standardized in the industrial standard IEC 61131-3, inter alia. One of these programming languages is structured text. Structured text is text based and comprises structuring capabilities based on high-level languages, inter alia, such as control flow instructions, for example.

The PLC languages of IEC 61131-3 have only limited suitability for motion control with NC controls. If, for example, NC commands are programmed in the PLC language by means of function blocks, this has the disadvantage that the cyclic pass through the control program and the repeated evaluation of the function blocks are resource-intensive and slow down program execution. Concurrent execution of NC control and programmable logic controller in which computations are relocated from the NC control to the programmable logic controller has the disadvantage that the communication required for this purpose between NC control and programmable logic controller slows down program execution as a whole and increases programming complexity.

It is an object of the present invention to allow improved control of machines. In particular, the invention is intended to allow machine control that can be programmed flexibly, simply and efficiently and at the same time allows fast, resource-saving execution of control programs.

This object is achieved by a translation module for a machine control according to claim 1, a processing module for a machine control according to claim 10 and a control system for controlling a machine according to claim 20. Further advantageous embodiments are respectively indicated in the dependent claims.

A translation module for a machine control is configured to process an input program code of a control program and to produce therefrom a uniform intermediate representation having work instructions for execution by the machine control. The input program code in this case comprises a first program code component and a second program code component, wherein the first program code component is written in a first programming language and the second program code component is written in a second programming language. The work instructions of the intermediate representation comprise a first work instruction and a second work instruction, wherein the first work instruction is produced on the basis of the first program code component and the second work instruction is produced on the basis of the second program code component.

Such a translator module advantageously allows language elements of the first programming language and of the second programming language to be combined when the control program is created. A programmer who has a command of both programming languages can therefore easily express language elements or structures that are not on hand in one of the programming languages by using those of the other programming language. Language elements of a programming language are all the meaningful units of a program code written in the programming language, for example instructions, declarations, assignments, control flow instructions, expressions, variables, keywords, numbers or strings. The language elements can be allocated symbols of the grammar of the relevant programming language.

The first program code component composed in the first programming language comprises character sequences that respectively represent symbols of the first programming language, and the second program code component composed in the second programming language comprises character sequences that respectively represent symbols of the second programming language. These symbols may be nonterminal symbols such as instructions, expressions, assignments, declarations or control flow instructions. The symbols may also be terminal symbols, for example literals, such as numbers or strings, descriptors, keywords or special characters. Terminal symbols can also be referred to as basic symbols of the respective programming language.

A character sequence of the input program code represents a nonterminal symbol of the first or the second programming language if the character sequence or a series of basic symbols that is represented by the character sequence can be derived from the nonterminal symbol according to the rules of the first or the second programming language. If the character sequence can be derived from the nonterminal symbol, then it can also be stated that the character sequence comprises the nonterminal symbol.

The first program code component and the second program code component may be interleaved in one another. This means that, in the input program code, a character sequence of the first program code component can be followed by a character sequence of the second program code component and the character sequence of the second program code component can in turn be followed by a character sequence of the first program code component. Similarly, the input program code can comprise further program code components that are written in the first programming language or in the second programming language.

The first programming language can allow, by way of example, imperative programming of the machine control and be designed so that a control program is executed once at execution time. The first programming language may be a programming language that is optimized for motion control, for example, but that has only a limited scope of language for control flow instructions or the use of variables or functions. In particular, the first programming language may be the language G code.

The second programming language may be a programming language that is optimized for use in programmable logic controllers, for example. The second programming language can in this case comprise high-level language elements that allow the use of named variables, of named functions having formal parameters or of control flow instructions, for example. In particular, the second programming language may be one of the PLC languages of the industrial standard IEC 61131-3, for example the language structured text.

The uniform intermediate representation is based on all the control instructions expressed by the first program code component and the second program code component of the input program code. Thus, the two parts of the control program that are formed by the first program code component and the second program code component are combined in the intermediate representation. The intermediate representation may be available, by way of example, in a form suitable for fast and efficient execution by the machine control, for example in an object-oriented form.

The first and second program code components composed in the first programming language and the first and second program code components composed in the second programming language can be combined in the uniform intermediate representation as work instructions to be executed sequentially. The effect advantageously achieved thereby is that control instructions coded in the first and second program code components can be handled by the machine control in the correct order of handling. Similarly, an advantageously simple interchange of data between parts of the control program that are formed by the first program code component and parts of the control program that are formed by the second program code component is made possible.

In the case of one embodiment of the translation module, the translation module comprises a resolution module that is configured to read in the first program code component and the second program code component from the input program code and to convert them into basic symbols. The resolution module is configured to adopt a first state and a second state. In this case, the resolution module in the first state converts the first program code component into basic symbols of the first programming language. The resolution module in the second state converts the second program code component into basic symbols of the second programming language.

Such a resolution module for reading in the input program code allows, in an advantageously simple manner, a translation module to be realized that converts an input program code having program code components of the first programming language and having program code components of the second programming language into a uniform intermediate representation. By way of example, ambiguous character sequences can exist that represent or depict a basic symbol both in the first programming language and in the second programming language, but respectively have different meanings in the two programming languages, that is to say can be converted into different basic symbols. By virtue of the resolution module respectively adopting one of the two states for the conversion of character sequences of the first program code component and of character sequences of the second program code component and using either basic symbols of the first programming language or basic symbols of the second programming language for the conversion, depending on the state, it is advantageously possible to make certain that ambiguous character sequences of this kind are always converted into basic symbols of the respectively used programming language.

A resolution module that is configured to adopt the first and the second state when program code components of an input program code are converted into basic symbols may be configured as a finite machine, for example. Beside the first and the second state, it is also possible for a finite number of further states of the resolution module to exist.

In the case of one embodiment of the translation module, the resolution module is configured to execute a state transition from the first state to the second state when a first control sequence is read in from the input program code and to execute a state transition from the second state to the first state when a second control sequence is read in from the input program code.

The first or the second control sequence can consist, by way of example, of a single character, for example a special character, or of a character sequence having multiple characters. The first and the second control sequence can consist of different or the same characters or character sequences.

The first control sequence can consist of a character or a character sequence that does not represent a basic symbol of the first programming language. Similarly, the second control sequence can consist of a character or a character sequence that does not represent a basic symbol of the second programming language. In these cases, reading-in of the first or the second control sequence by the resolution module merely initiates a state transition by the resolution module. Alternatively, the first control sequence or the second control sequence can also represent a basic symbol of the first or the second programming language. The resolution module in these cases produces the represented basic symbol, and executes a state transition, when the first or second control sequence is read in.

The use of the first and the second control sequence allows the first program code component and the second program code component in the input program code to be easily distinguished from one another. This allows the input program code to be explicitly resolved into basic symbols of the first and the second programming language and allows conflicts on account of ambiguous character sequences in the input program code to be precluded.

In the case of one embodiment, the translation module comprises a parser module that is configured to create a uniform structure tree of the control program from the basic symbols, wherein the parser module is configured to execute a syntactic check on the input program code on the basis of a combined grammar. In this case, the combined grammar comprises rules of a first grammar of the first programming language and rules of a second grammar of the second programming language.

The rules that the combined grammar comprises from the first and second grammars can prescribe, by way of example, the manner in which character sequences that are respectively valid in the first or in the second programming language and that represent instructions, expressions, assignments, keywords, for example from control flow instructions, or numbers and descriptors, for example, are formed. Hence, these character sequences that are valid in the first or the second programming language also again form valid character sequences of the combined grammar. In this respect, the combined grammar defines a programming language that is a combination of the first and the second programming language and can therefore also be referred to as a combination language. In addition to the rules of the first grammar and the rules of the second grammar, the combined grammar can comprise rules according to which symbols of the first programming language can be combined with symbols of the second programming language.

The syntactic check on the input program code by the parser module advantageously allows the input program code to be checked completely for syntactic correctness when it is actually read in. In this case, completely means particularly that both errors with respect to the first grammar and errors with respect to the second grammar and possibly also errors that are based on differences in rules for combining the first and second grammars can be identified. The syntactic check by the parser module of the translation module can be executed at loading time for the control program, for example. This advantageously safely precludes interruptions in the control program at execution time on account of syntactically erroneous input program codes.

In this case, the uniform structure tree comprises all the basic symbols produced from the input program code by the resolution module, and also nonterminal symbols of the combined grammar. The nonterminal symbols are in this case produced by the parser module from the series of basic symbols. If the rules of the combined grammar comprise rules according to which symbols of the first programming language can be combined with symbols of the second programming language, then a first node of the structure tree that is associated with a symbol of the first programming language can have a second node, as a child node, that is associated with a symbol of the second programming language. Similarly, a node of the structure tree that is associated with a symbol of the second programming language can have, as a child node, a node associated with a symbol of the first programming language. The structure tree can thus comprise particularly a subtree that firstly comprises symbols of the first programming language and that secondly includes a subtree comprising symbols of the second programming language.

In the case of one embodiment of the translation module, the first programming language is G code and/or the second programming language is structured text. The language G code is advantageously particularly suitable for composing control programs for a machine control for motion control. The limited scope of language of G code, for example with respect to variables, data types, functions and control flow instructions, can advantageously be compensated for when writing the input program code by virtue of the relevant language elements of the language structured text being used for these elements. Since both languages are programming languages that are widely used for programming machine controls, a programmer familiar with programming machine controls can advantageously create, without great effort for learning and acquaintance, control programs that combine program code components or language elements of the language G code and the language structured text.

In the case of one embodiment of the translation module, the input program code comprises a series of instructions having a first instruction and a second instruction, wherein the first program code component comprises the first instruction and the second program code component comprises the second instruction and wherein the first instruction consists of a G code sentence and the second instruction consists of an ST instruction.

In this case, the ST instruction is written in the programming language structured text, and the G code sentence is written in the programming language G code. The ST instruction may be, according to the rules of the grammar of structured text, a language element such as an assignment, a control flow instruction or a function call, for example. An assignment can in turn comprise an expression, for example. A G code sentence consists of a series of G code words, wherein the G code words generally comprise an address letter and a value. The value can consist of a number or be provided by an expression that can be evaluated to form a number. The expression can include one or more computation operations such as multiplication or addition, for example.

By virtue of the translation module of a machine control being configured to process an input program code having a series of instructions that consist of ST instructions and G code sentences, the machine control can advantageously be controlled by an input program code that includes a mixture of instructions of the two programming languages. By way of example, the machine control may be configured to execute ST instructions and G code sentences respectively in the order in which the respective instructions are included in the input program code.

In the case of one embodiment of the translation module, the input program code comprises a G code word having an address letter and a value, wherein the first program code component comprises the address letter and the second program code component comprises the value, and wherein the value comprises an ST expression. In the ST expression, it is advantageously possible for ST variables or ST functions to be used for computing the value of the G code word. This allows, inter alia, the value used in the G code word to be computed dynamically by means of the ST expression at the runtime of the control program and, by way of example, current process variables to be incorporated into the computation of the value. This extends the scope of language of the language G code, for which it is usually possible to use only constant values, i.e. values available at the loading time for the control program.

In the case of one embodiment of the translation module, the input program code comprises a G code word having an address letter and a value, wherein the first program code component comprises the address letter and the value and the value comprises an ST variable. By virtue of the translation module being configured to process an input program code having a G code word whose value comprises an ST variable, it is advantageously possible for the current numerical value of the ST variable at execution time to be used for the execution of a control instruction of the control program that comprises the G code word. This allows, by way of example, the numerical value of the variable to be computed dynamically on the basis of process parameters available at runtime.

In the case of one embodiment of the translation module, the translation module comprises an analysis module, wherein the analysis module is configured to execute a semantic check on the input program code on the basis of a combined semantic system. In this case, the combined semantic system comprises stipulations of a first semantic system of the first programming language and stipulations of a second semantic system of the second programming language.

The semantic analysis can involve, by way of example, a check on the input program code in respect of purity of type for the included expressions, in respect of the association of names for variables and functions used or in respect of the correct use of functional parameters being executed. The combined semantic system can in this case comprise not only the stipulations of the semantic system of the first programming language and the stipulations of the semantic system of the second programming language but also further stipulations that regulate the combination of basic symbols of the first programming language with those of the second programming language. The analysis module can execute the semantic analysis of the input program code at the loading time of the control program and before execution of the control program. This advantageously allows static-semantic errors to be identified at loading time and, in particular, it to be precluded that execution of the intermediate representation of the control program needs to be interrupted or terminated at execution time on account of semantic errors.

In the case of one embodiment of the translation module, the translation module comprises a memory allocation module, wherein the memory allocation module is configured to allocate a memory address of a memory of a control system comprising the machine control to a variable included in the input program code. By virtue of the variables used in the input program code being assigned to the memory addresses before creation of the intermediate representation, it is possible for an intermediate representation to be produced that can advantageously be executed efficiently. In particular, the complexity for memory management at the execution time of the control program is reduced.

A processing module for a machine control is configured to process an intermediate representation having work instructions and to take the work instructions as a basis for producing control commands for controlling a machine connected to the machine control. In this case, the processing module comprises an execution module and an NC processor, wherein the execution module is configured to take the work instructions of the intermediate representation as a basis for producing an NC instruction and to transfer the latter to the NC processor, and wherein the NC processor is configured to take the NC instruction as a basis for producing the control command.

The NC instruction can be produced by the execution module such that it can be expressed completely in one programming language. This programming language may be, by way of example, a programming language that has been used for writing an input program code on which the intermediate representation is based. If a combination language comprising a first and a second programming language has been used for writing the input program code, then the programming language on which the NC instruction is based may be the first programming language, for example.

The second programming language used for writing the input program code on which the work instructions are based can include, by way of example, language elements that are not comprised by the first programming language. These language elements may be, by way of example, high-level language elements, such as named variables, named functions having formal parameters or control flow instructions. The processing of the work instructions can involve the execution module evaluating these high-level language elements completely. The NC instruction can then be converted into the control command by the NC processor without memory access operations, evaluations of variables or evaluations of control flow instructions.

The execution module may be configured to evaluate variables or function calls comprised by the intermediate representation and to produce the NC instruction by using, rather than the variables or function calls, explicit numerical values that are obtained during the evaluation of the function or variables at the time of handling of the intermediate representation. As result, the NC instruction can advantageously comprise data obtained or produced during production of the control commands at the runtime of the control program even in a case in which the programming language on which the NC instruction is based does not support variables or functions.

The NC instruction may be based particularly on a programming language that does not comprise high-level language elements but is particularly suitable for the stipulation of movement instructions. This programming language may be, by way of example, the language G code and the execution module may be configured to produce NC instructions that can be expressed by G code. The NC processor may then essentially be configured as a G code interpreter or translator, for example. The processing of the intermediate representation by the execution module to form work instructions based on G code then advantageously allows the language G code to be extended by high-level language elements of another programming language, for example the language structured text.

In the case of one embodiment of the processing module, the execution module is configured to produce a further control command for controlling the machine. The execution module is thus configured to produce a control command without said control command being created by the NC processor on the basis of an NC instruction. This advantageously allows even control commands that cannot be expressed in the programming language used for depicting the NC instructions to be used for controlling the machine.

In the case of one embodiment of the processing module, the processing module comprises a sorting module that is configured to receive the control command and the further control command and to output the control command and the further control command in an order of actuation. The processing module may be configured, by way of example, so that the execution module and the NC processor are executed in parallel, so that the control command can be produced by the NC processor and the further control command can be produced by the handling module concurrently.

By way of example, the execution module is able, after it has transmitted an NC instruction for producing the control command to the NC processor, to process a further work instruction of the intermediate representation, on the basis of which work instruction the execution module produces the further control command. Delays in the execution in NC processor or execution module can lead to the control command and the further control command not being output in the chronological order needed for motion control. In such a case, the sorting module advantageously makes certain that the control command and the further control command are transmitted to the machine that is to be controlled in accordance with the order of execution that is needed for the motion control for the machine.

In the case of one embodiment of the processing module, the execution module is configured to read data from a memory of a control system comprising the machine control and/or to write data to the memory. This advantageously allows the machine control to be able to process an input program code, of a control program, that comprises high-level language elements such as named functions having formal parameters or named variables. The content of the variables or parameters can be written to the memory or read from the memory at the execution time of the control program by the execution module. If the NC instructions transmitted to the NC processor are based on a programming language that does not comprise high-level language elements of this kind, then the processing module may also be configured so that only the execution module but not the NC processor can access the memory of the control system.

In the case of one embodiment of the processing module, the execution module is configured to receive a piece of status information about a status of the NC processor from the NC processor. This advantageously allows the respectively current status of the NC processor at execution time to be taken into consideration for the processing of the work instructions of the intermediate representation. By way of example, this allows conditions of control flow instructions to be based on the current status of the NC processor. The status information may be an activated coordinate transformation or tool information, for example.

In the case of one embodiment of the processing module, the intermediate representation comprises a series of object pointers to instruction objects, wherein the instruction objects refer to methods that include the work instructions. This advantageously allows object-based and particularly efficient handling of the intermediate representation by the execution module. The instruction objects can also include static data as attributes, wherein the data are used by the translation module and are read during the handling of the work instructions from the method.

In the case of one embodiment of the processing module, the work instructions are available as machine code. In the case of one embodiment of the processing module, the execution module is configured to transfer the NC instruction to the NC processor as a data structure, particularly as a binary data structure. This advantageously allows particularly fast and efficient handling of the work instructions by the execution module or of the NC instructions by the NC processor at the runtime of the control program. This advantageously makes certain that control commands for controlling the machine are always available even in the case of fast execution of machine movements.

In the case of one embodiment of the processing module, the NC instruction represents a G code sentence. This advantageously allows a movement instruction, represented by the NC instruction, for the machine that is to be controlled to be efficiently represented by a few parameters from geometric elements. This reduces the volume of data that is needed for depicting the NC instruction, and advantageously fast production of the control commands from the work instructions of the intermediate representation is made possible.

In the case of one embodiment of the processing module, the execution module is configured as a stack machine. In this case, the work instructions of the intermediate representation may respectively be stack commands that manipulate a runtime stack of the stack machine. An execution module configured as a stack machine allows particularly simple and efficient execution of the intermediate representation.

A control system for controlling a machine has a machine control, wherein the machine control comprises a translation module and a processing module. The translation module of the machine control may be configured, by way of example, to produce from the input program code the uniform intermediate representation having work instructions for processing by the processing module. The processing module may be configured to take the work instructions as a basis for producing control commands for controlling the machine. By virtue of the control system comprising the machine control with the translation module and the processing module, advantageously simple and fast processing and execution of the input program code with control sequences of the first and second programming languages is made possible.

The production of the uniform intermediate representation advantageously allows the input program code to be conditioned such that it can be executed continuously and essentially sequentially in an efficient and resource-saving manner at the runtime of the control program. Additionally, during the processing of the intermediate representation by the execution module of the processing module, it is possible for NC instructions to be produced, for example, that can be described completely by the first programming language. This advantageously allows the NC processor to be able to be optimized for the processing of the first programming language. Overall, the machine control of the control system thus allows, in an advantageously simple, efficient and resource-saving manner, an input program code to be processed for which the first programming language has been augmented by language elements of the second programming language, but wherein the production of the control commands by the NC processor is again based exclusively on the first programming language.

In the case of one embodiment of the control system, the control system comprises an NC core and a setpoint value channel. The NC core is configured to receive the control commands of the processing module, to take the control commands as a basis for producing setpoint values for the machine and to transfer the setpoint values to the machine via the setpoint value channel. Moreover, the machine control forms part of a user program environment of the control system and the NC core forms part of a realtime environment of the control system.

Like the NC instructions, the control commands can comprise parameterized geometric elements that describe the movement instructions for the machine that is to be controlled. As a result, the control commands comprise an advantageously small volume of data, which means that they can be transferred to the NC core particularly quickly. By virtue of the NC core converting the control commands into setpoint values, the information about the movements to be executed can advantageously be transferred in a form that can be processed particularly simply by one or more position controllers of the machine. Additionally, the NC core may be configured to condition the movement instructions parameterized by geometric elements. This can comprise, by way of example, interpolation of the machine movement to be executed at discrete points that are prescribed by the times at which the setpoint values are meant to be generated.

The control system may be configured to execute the modules of the user program environment and the modules of the realtime environment on a control computer and to respectively apportion computation time of the control computer to the modules of the realtime environment at stipulated intervals of time. The computation time can respectively comprise a stipulated period and respectively be permanently assigned to a module, so that it is certain that the relevant module of the realtime environment is not dispossessed of the computation time. As result, it is advantageously possible to make certain that output values of the modules of the realtime environment, for example setpoint values of the NC core, are produced continuously at fixed intervals of time.

The user program environment of the control program can comprise all the modules whose execution is not time critical, that is to say that do not have to be assigned a fixed proportion of the computation time of the control computer and that can also be dispossessed again of an execution time window if need be during the execution.

By virtue of the control system being configured so that the machine control forms part of the user program environment and the NC core forms part of the realtime environment, the number of computations to be executed by the realtime environment can advantageously be kept small. The processing of the input program code and the production of the intermediate representation by the translation module of the machine control, which may be relatively computation intensive, can advantageously be executed before actual execution of the control program. At execution time, it is then possible for the intermediate representation to be converted into control commands for the NC core by the processing module of the machine control in an advantageously efficient manner.

In the case of one embodiment of the control system, the control system comprises a memory and the machine control is configured to write data to the memory and/or to read data from the memory. This advantageously allows the machine control to be able to use named variables or named functions having parameters during the production of the control commands from the input program code of the control program, wherein the values of the variables or parameters can be stored in the memory. This advantageously allows a programming language that comprises variables or functions to be used for writing the input program code. The memory access can be effected by the execution module of the machine control, for example.

In the case of one embodiment of the control system, the control system comprises a PLC module, wherein the PLC module is configured to control the processing of the input program code of the control program by the machine control. Moreover, the PLC module is configured to interchange data with the memory.

The PLC module makes functions of a programmable logic controller available. The PLC module may be configured, by way of example, to prompt the loading, execution and termination of a control program by the machine control. Moreover, the PLC module may be configured to control functions of the machine or of an installation comprising the machine that do not comprise the actual motion control. By way of example, the PLC module may be configured to control and monitor an entire production process of an installation comprising the machine.

By virtue of the PLC module, like the machine control, being able to access the memory of the control system, the memory can be used to interchange data between the machine control and the PLC module in an advantageously simple manner. As a result, the PLC module can take into consideration status messages or current values of variables or parameters during the process control, for example. It is also possible for the PLC module to convey movement parameters that are meant to be taken into consideration during the handling of the control program to the machine control. These may be information about a workpiece to be machined or a tool to be used, for example.

BRIEF DESCRIPTION OF THE FIGURES

The invention is explained in more detail below with reference to figures, in which.

DETAILED DESCRIPTION

Figure 1:
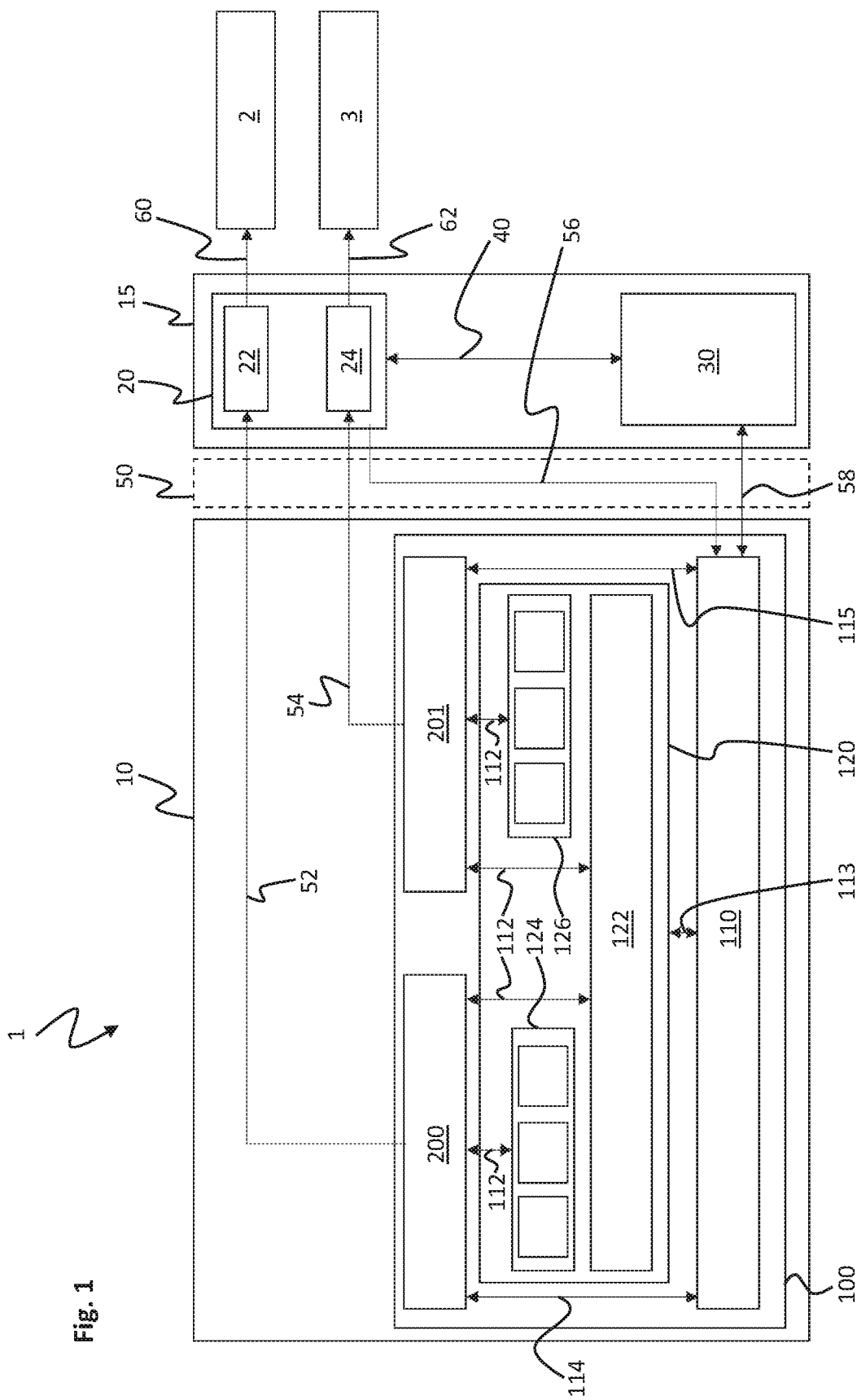
FIG. 1 shows a schematic depiction of a control system having a machine control.

FIG. 1 shows a control system 1 having a machine control 200 that is part of a server module 100. The machine control 200 is connected via a control command channel 52 to an NC channel module 22 of an NC core 20. The NC channel module 22 is connected via a setpoint value channel 60 to a machine 2 that is controlled by the control system 1.

The control system 1 may be configured to perform motion control for the machine 2. To this end, the control system 1 is configured to produce setpoint values and to transfer them via the setpoint value channel 60 to the machine 2. The setpoint values can comprise a position, speed or acceleration of a moving machine part of the machine 2. The setpoint values can be used, by way of example, by a position controller of the machine 2 as a reference variable to which an initial value, determining the movement of the machine part, of a controlled system is corrected. This initial value may be a position of the moving machine part, for example.

The machine 2 may be, by way of example, a machine tool such as a milling machine, a lathe or a welding machine and the setpoint values can prescribe the position, speed or acceleration of a tool or of a workpiece holder of the machine, for example. The machine 2 may alternatively be a transport device, wherein the setpoint values prescribe the movement of a transport carriage of the transport apparatus.

In the case of other embodiments of the control system 1, the position controller that processes the setpoint values may also be configured as a module of the control system 1. In this case, the setpoint value channel 60 is configured as a data connection between the NC core 20 and a further module of the control system 1. It is then possible for merely controller output variables for an actuating device of the machine 2 to transfer to the machine 2. The controller output variables may be, by way of example, power values for an electric motor that drives the machine and forms part of the actuating device.

Beside the setpoint values, supplementary commands are also transferred to the machine 2 via the setpoint value channel 60. The supplementary commands can define the tool to be used by the machine 2, for example, or can prompt a tool change or control supplementary functions of the machine 2, such as a coolant flow or a suction apparatus.

The setpoint values transferred via the setpoint value channel 60 are produced by the NC channel module 22 on the basis of control commands that are produced by the machine control 200 and are transferred to the NC core 20 via the control command channel 52. The control commands include movement instructions that parameterize the machine movements to be executed by the machine.

The movement instructions of the control commands can comprise, by way of example, geometric elements that describe a path to be taken by the moving machine part. In this case, the geometric elements may be prescribed by a set of geometric parameters. If the geometric element is a straight line, for example, then the geometric parameters can be the start and end of the straight line in a suitable coordinate system. If the geometric element is a circle segment, for example, then the geometric parameters can comprise the circle center, the radius of the circle and the start and end of the circle. The movement instructions can also include movement information that stipulates the execution of the machine movements along the geometric elements. Such a piece of movement information can comprise a piece of information about a feed or a speed of the machine part, for example. If the machine 2 is a machine tool, then the movement information can also comprise tool parameters, for example the type of the tool to be used or the speed of a milling or drilling tool.

The NC core 20 may be configured to produce and output the setpoint values for the machine 2 continuously and at fixed intervals of time in a cycle time. To produce the setpoint values, the NC core 20 may be configured to interpolate the geometric elements of the movement instructions, so that at least one setpoint value is available for each execution cycle. For the interpolation, the NC core 20 can take into consideration characteristics of the machine 2, for example, such as kinematics, acceleration capability and moments of inertia, for example. The NC core 20 can buffer-store the control commands received via the control command channel 52 in a FIFO memory before it uses them to produce the setpoint values for transfer via the setpoint value channel 60. The setpoint value channel 60 between the NC core 20 and the machine 2 may be realized by means of a field bus system, for example.

The server module 100, which comprises the machine control 200 for producing the control commands, has a memory 120 and a server control module 110. The machine control 200 is connected to the memory 120 via memory access channels 112. The memory access channels 112 can be used by the machine control 200 to access a shared memory area 122 and a local memory area 124 of the memory 120 and to read data from the memory areas 122, 124 and to write data to the memory areas 122, 124.

The server control module 110 is connected via a control channel 114 to the machine control 200. The control channel 114 can be used by the server control module 110 to control the machine control 200. By way of example, the server control module 110 can use the control channel 114 to prompt the loading, execution or termination of a control program by the machine control 200. Similarly, the server control module 110 can request information about a status of the machine control 200 via the control channel 114. Such a status can indicate, by way of example, that the machine control 200 is active, that is to say executes a control program, is inactive, that is to say does not execute a control program, or is blocked during the execution of a control program and, by way of example, awaits an external instruction of another module of the control system 1.

The server control module 110 can use a server data channel 113 to likewise access the memory 120 of the control system 1. In this case, access both to the shared memory area 122 and to the local memory areas 124, 126 can be effected.

The server module 100 comprises not only the machine control 200 but also a further machine control 201. The further machine control 201 is connected via a further control command channel 54 to a further NC channel module 24 of the NC core 20. Unless explicitly described otherwise, the further machine control 201, the further control command channel 54 and the further NC channel module 24 are configured like the machine control 200, the control command channel 52 and the NC channel module 22, respectively. Like the NC channel module 22, the further NC channel module 24 is configured to generate setpoint values from control commands that it receives via the further control command channel 54. The setpoint values are transmitted to a further machine 3 via a further setpoint value channel 62 in order to control a movement of the further machine 3.

Alternatively, the further NC channel module 24 may also be connected to the machine 2 and the setpoint values produced by the further NC channel module can be used beside the setpoint values produced by the NC channel module 22 for the motion control for a further machine component or a further degree of freedom of the machine 2.

Like the machine control 200, the further machine control 201 can use memory access channels 112 to access the memory 120 of the server module. In this case, the further machine control 201, like the machine control 200, can access the shared memory area 122. Additionally, the further machine control 201 can, analogously to the access by the machine control 200 to the local memory area 124, access a further local memory area 126, wherein the further local memory area 126 is configured separately from the local memory area 124 of the machine control 200. Using the shared memory area 122, the machine control 200 and the further machine control 201 can interchange data, for example during the execution of control programs. The further machine control 201 is controlled in the same manner as the machine control 200 via a further control channel 115 by the server control module 110.

The control system 1 comprises not only the server module 100 and the NC core 20 but also a PLC module 30. The PLC module 30 makes functionalities of a programmable logic controller available. It can control the operation of an installation comprising the machines 2, 3 as components. The PLC module 30 may be connected via data lines to the machines 2, 3 or other components of the installation. The PLC module 30 can read sensors of the installation components and take the read values as a basis for creating output values for actuators arranged on the installation. In this case, the PLC module can be used for regulating operating variables of the installation, for example.

The PLC module 30 is configured to control and monitor execution of control programs by the machine controls 200, 201 on the basis of the process state of the installation comprising the machines 2, 3. To this end, the PLC module 30 uses a server control channel 58 to communicate with the server control module 110 of the server module 100. The server control channel 58 can also be used by the PLC module 30 to interchange data with the server control module 110, so that the PLC module 30 can use the server control module 110 to access the entire memory 120.

By way of example, the PLC module 30 uses the server control module 110 to prompt the loading, execution and termination of a control program by the machine controls 200, 201. During the loading and during the execution of a control program by the machine control 200 or the further machine control 201, the PLC module 30 can also use the server control module 110 to write current process parameters to the memory 120, and the process parameters can be used or taken into consideration for the execution of the control program by the respective machine control 200, 201. Additionally, the server control module 110 can transmit information to the PLC module 30. This information may be runtime error messages or the execution status of the machine controls 200, 201, for example.

The PLC module 30 is configured to interchange data and information with the NC core 20 via an interchange channel 40. The interchange channel 40 may be realized as a shared memory, for example, that both the PLC module 30 and the NC core 20 can access. Using the interchange channel 40, the PLC module 30 and the NC core 20 can interchange status information, for example, or the execution of the PLC module 30 and of the NC core 20 can be synchronized.

The NC core 20 is connected to the server control module 110 via a status message channel 56 for the purpose of information interchange. The status message channel 56 can be used by the NC core 20 to report that all the received control commands have been handled, for example. Similarly, messages about errors that occur during the handling of the control commands can be transferred to the server control module 110.

Beside the machine control 200 and the further machine motor 201, the control system 1 can comprise additional machine controls that are configured like the machine controls 200, 201 and actuate additional machines or machine axles.

The control system 1 comprises a control computer that is configured to execute the modules of the control system 1 as program components. The server module 100 having the machine controls 200, 201 is in this case executed as part of a user program environment 10 of the control system 1, while the NC core 20 and the PLC module 30 are executed as parts of a realtime environment 15 of the control system 1. The modules of the realtime environment 15 are apportioned computation time of a stipulated duration by the control computer cyclically at fixed intervals of time. In this case, the duration is respectively proportioned such that the modules are able to conclude all the computations to be executed within a cycle and to output appropriate output values for machines connected to the control system 1, including the setpoint values for the position controllers of the machines 2, 3.

The user program environment 10 comprises all the modules executed on the control computer that are not executed under realtime conditions. These include the server module 100 and the machine controls 200, 201, for example.

The modules of the user program environment 10 are apportioned computation time of different duration variably on the basis of the utilization level of the control computer.

An interchange of data between the modules of the user program environment 10 and the modules of the realtime environment 15 is effected via a data transfer channel 50. In this case, the data transfer channel comprises particularly the control command channel 52, the further control command channel 54, the status message channel 56 and the server control channel 58. The data transfer channel 50 may be configured as a data bus, for example, and the data interchange via the data transfer channel 50 can be effected by means of an interchange of data packets. An example of a control system having a realtime environment, a user environment and a data transfer channel is the TwinCAT control system, for example. In a TwinCAT control system, the user program environment 10 is also referred to as "user-space". If the control system 1 is a TwinCAT control system, the server module 100 may be implemented as a service of the Windows operating system of the control computer. The server module 100 is then respectively started and initialized during the system start of the control computer of the control system 1.

So that a data stream of control commands is available for each NC channel module 22, 24 and hence a data stream of setpoint values is available for each position controller of the machines 2, 3, the server control module 110 instantiates a respective machine control 200, 201 for each NC channel module 22, 24 of the NC core 20 at the start of the control system 1. The machine controls 200, 201, just like the NC channel modules 22, 24, are executed concurrently. This allows the setpoint values for the machines 200, 201 to be generated essentially independently of one another by the control system 1. Synchronization of the setpoint value generation is possible via the PLC module 30 and the server control module 110, and data interchange between the machine controls 200, 201 via the shared memory area 122.

Subsequently, the design and operation of the machine control 200 and the further machine control 201 are depicted. In this case, reference is made exclusively to the machine control 200 and the modules interacting with the machine control 200, for example the NC channel module 22. However, all explanations similarly apply to the further machine control 201 and the modules interacting with the further machine control 201, for example for the further NC channel module 24.

Figure 2:
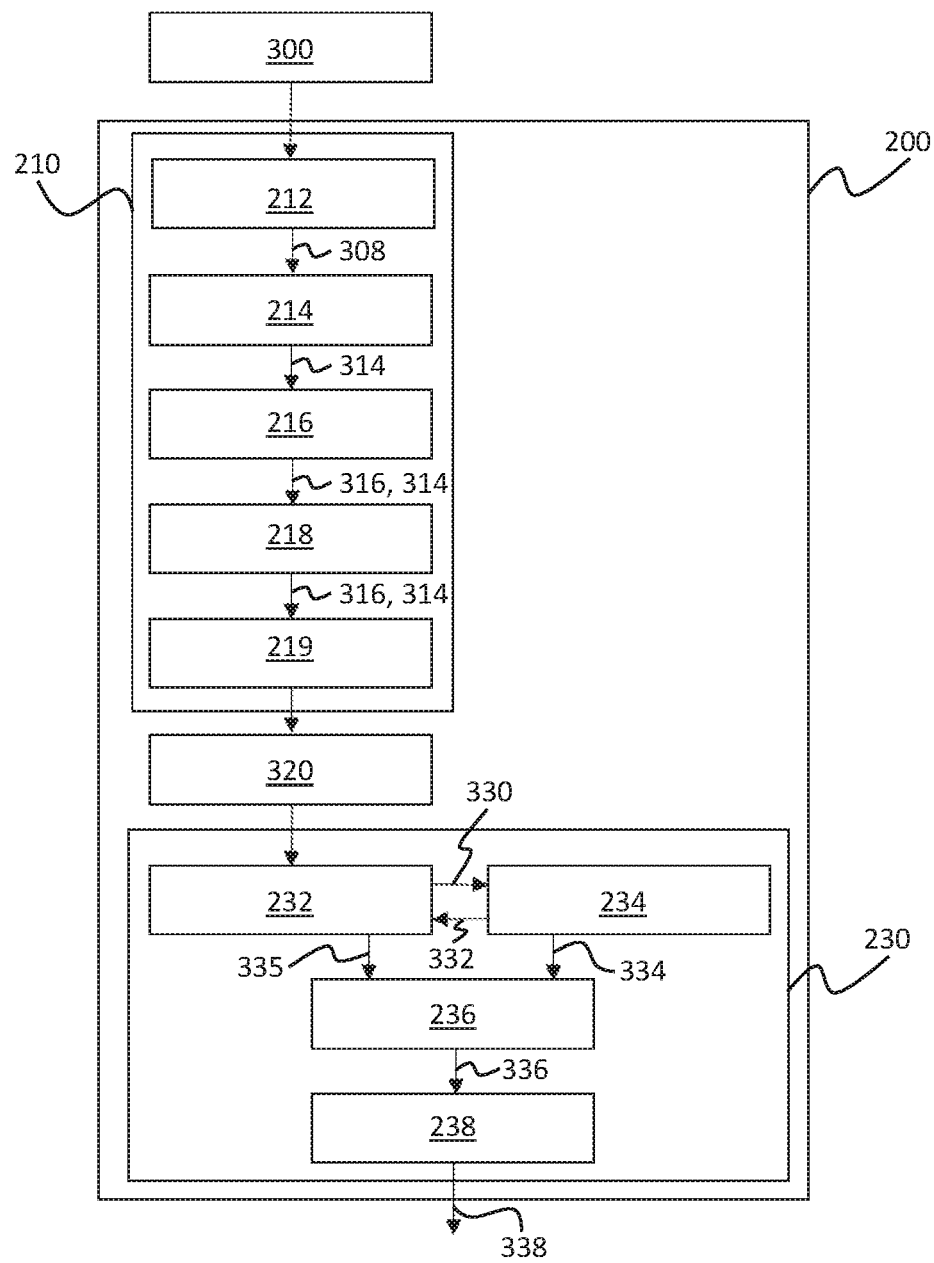
FIG. 2 shows a schematic depiction of the machine control with a translation module and a processing module having an execution module.

FIG. 2 shows a schematic depiction of the machine control 200. The machine control 200 comprises a translation module 210 and a processing module 230. The translation module 210 is configured to process an input program code 300 of a control program and to produce from the input program code 300 a uniform intermediate representation 320 having work instructions for execution by the processing module 230 of the machine control 200. The processing module 230 is configured to process the work instructions of the intermediate representation 320 and to take the work instructions as a basis for producing a stream of core-specific control commands 338 that are transferred via the control command channel 52 to the NC channel module 22 of the NC core 20. The NC channel module 22 takes the core-specific control commands 338 as a basis for producing the setpoint values transferred to the machine 2 via the setpoint value channel 60.

The processing of the input program code 300 and the creation of the intermediate representation 320 can be effected at loading time, that is to say after the loading of the input program code 300 and before processing of the intermediate representation 320 by the processing module 230. In this respect, the translation module 210 is a compiler or a translator for the input program code 300.

The input program code 300 is the source text of the control program and is written in a combination language. The combination language is a programming language that comprises a combination of rules of a first programming language and rules of a second programming language. The input program code composed in the combination language comprises a first program code component written in the first programming language and a second program code component written in the second programming language.

The first and second program code components respectively comprise character sequences of the input program code. The character sequences comprise a character, such as a letter, a digit or a special character, or a series of characters. The character sequences of the first program code component represent basic symbols of the first programming language, and the character sequences of the second program code component represent basic symbols of the second programming language. The basic symbols themselves in turn represent language elements such as descriptors, keywords, special characters or literals, such as numbers or strings.

The basic symbols of the first program code component written in the first programming language are in this case included in a first basic symbol set of the first programming language and the basic symbols of the second program code component written in the second programming language are included in a second basic symbol set of the second programming language. The first basic symbol set comprises all basic symbols that are valid according to the first programming language. Analogously, the second word set comprises all basic symbols that are valid according to the second programming language. The valid basic symbols of the first programming language may be defined by regular expressions of a first basic symbol specification, for example, and the valid basic symbols of the second programming language may be defined by regular expressions of a second basic symbol specification, for example. The basic symbol specifications may respectively be a regular grammar, for example.

The combination language is described by a combined grammar that comprises rules for forming code sections or character sequences that are valid in accordance with the combination language. The rules are also called production rules or productions. Since the combination language is a combination of the first programming language and the second programming language, the combined grammar includes rules of the first programming language and rules of the second programming language. In this case, the combined grammar may respectively include some or all of the rules of the first grammar or of the second grammar. Additionally, the combined grammar can comprise one or more embedding rules. The embedding rules describe the manner in which basic symbols or nonterminal symbols of the first programming language, that is to say literals, variables, expressions or instructions, for example, and basic symbols or nonterminal symbols of the second programming language can be combined with one another.

In particular, the combined grammar comprises a first rule of the first grammar and a second rule of the second grammar. The combined grammar can furthermore comprise a first embedding rule. The first embedding rule defines an embedding of the first programming language into the second programming language, that is to say describes a combined character sequence for which a part of a character sequence that represents a symbol of the second programming language and is included in the second program code component is replaced by a character sequence that represents a symbol of the first programming language and is included in the first program code component. Accordingly, the embedding rule describes a derivation of a symbol of the second programming language, that is to say an instruction or an expression in which a symbol of the first programming language is used, for example.

Analogously, the combined grammar can comprise a second embedding rule that describes an embedding of the second programming language into the first programming language. The second embedding rule thus describes a combined character sequence for which parts of a character sequence that represents a symbol of the first programming language and is included in the first program code component are replaced by a character sequence that represents a symbol of the second programming language and is included in the second program code component. Accordingly, the embedding rule describes a derivation of a symbol of the first programming language in which a symbol of the second programming language is used. Furthermore, the combined grammar can comprise a variable embedding rule that defines a use of a variable, for example of the second programming language, in a character sequence of the first programming language.

The first programming language may be the language G code and the second programming language may be the language structured text, for example. The combined grammar of the combination language consisting of G code and structured text essentially comprises all the rules and productions of the first grammar of G code and essentially all the rules and productions of the second grammar of structured text. The language G code within the context of this application comprises and denotes both standard-compliant G code according to ISO 6983 and variants of standard-compliant G Code, as is used by different manufacturers of control systems, that are extended by additional language elements. Similarly, the language structured text within the context of this application comprises and denotes both standard-compliant structured text according to IEC 61131-3 and variants of standard-compliant structured text that are extended by additional language elements.

A start symbol of the combined grammar of the combination of G code and structured text stipulates that the input program code 300 is a character sequence that represents a nonterminal symbol "instructions". A rule of the combined grammar recursively stipulates that a derivation of "instructions" consists of "instructions" and a nonterminal symbol "instruction" or is the blank element. In this case, "instruction" in accordance with a first rule of the combined grammar may be a nonterminal symbol "ST instruction" associated with the second programming language. The nonterminal symbol "ST instruction" describes a language element that is an ST instruction, that is to say an instruction formed according to the rules of the second grammar of the language structured text.

The first embedding rule of the combined grammar stipulates that the nonterminal symbol "instruction" can also be replaced by a nonterminal symbol "G code sentence" that is associated with the first programming language, wherein the nonterminal symbol "G code sentence" is formed according to the rules of the first grammar of the language G code. In this respect, the first embedding rule is an embedding of the language G code into the language structured text.

In particular, the input program code 300 can comprise a first instruction and a second instruction, wherein the first instruction and the second instruction are respectively character sequences that represent the nonterminal symbol "instruction". In this case, the first instruction consists of an ST instruction, that is to say a character sequence formed according to the rules for the nonterminal symbol "ST instruction", while the second instruction consists of a G code sentence, that is to say a character sequence formed according to the rules for the nonterminal symbol "G code sentence".

The ST instruction may, according to the rules of the second grammar of structured text, be, by way of example, a variable assignment or a control flow instruction, such as a "while" loop or an "if" instruction, for example. The "while" loop or the "if" instruction can comprise, in accordance with the second grammar, by way of example, a character sequence that is associated with the second programming language and that represents a nonterminal symbol "condition", and a character sequence that represents the nonterminal symbol "instructions". Since a derivation of the nonterminal symbol "instructions" can also comprise the nonterminal symbol "G code sentence" associated with the first programming language, the first embedding rule allows a control flow instruction of the language structured text to be used in conjunction with one or more of the instructions of the type G code sentence. In this respect, the first embedding rule extends the language G code, inter alia, by control instructions or control structures of the language structured text.

The first grammar of G code includes a rule that a derivation of the nonterminal symbol "G code sentence" consists of a series of nonterminal symbols "G code word" and a concluding basic symbol "G-Newline". The basic symbol "G Newline" is represented by a line end of a program code line of the input program code 300.

A character sequence that represents the nonterminal symbol "G code word" can also be referred to as a G code word. The language element G code word always comprises an address letter and a value. The value may be a number, but it may also be an expression that can be evaluated to form a number. For the description of a G code word with a number as value, the first grammar comprises a rule according to which the nonterminal symbol "G code word" can be derived to form a pair comprising a basic symbol "address letter" associated with the first programming language and a basic symbol "G decimal number" associated with the first programming language.

The basic symbol "address letter" is a basic symbol of the first programming language G code and is represented by a character sequence with the address letter of the G code word. This letter can also be referred to as the content of the basic symbol. The letter may be "G", for example, if the G code word is a movement instruction or a machining instruction, or may be "M" if the G code word is an assistance instruction. The movement instruction can parameterize a machine movement, for example by means of a geometric element, for example a line or a circle segment. The assistance instruction may be, by way of example, a command for switching on or off a machining tool, for example a milling spindle. The basic symbol "G decimal number" represents a decimal number with a number type that is valid in G code, for example "LReal".

A G code word, in the case of which the value is provided by an expression, can, in accordance with the first grammar, comprise as a value a character sequence that is a G code expression composed in the first programming language. Therefore, a rule of the first grammar states that the nonterminal symbol "G code word" can comprise, instead of the basic symbol "G decimal number", a series comprising a basic symbol "=" associated with the first programming language and a character sequence that represents a nonterminal symbol "G expression" associated with the first programming language. "G expression" can, in accordance with the first grammar, in turn be derived to form a series comprising one or more basic symbols "G decimal number" and one or more basic symbols "arithmetic operator" that are associated with the first programming language and are arithmetic operators, for example for addition or multiplication. The character sequence of the G code expression describes an expression that can be evaluated to form a decimal number and describes a series of additions and multiplications, for example. If the G code expression is G-code-standard-compliant, it cannot comprise parenthesized expressions or functions. If the G code word comprises an address letter and, as a value, a G code expression, then it is included in the first program code part of the input program code 300.

The combined grammar stipulates that a G code word, in the case of which the value is provided by an expression, can also include, as a value, an ST expression composed in the second programming language. In this case, the ST expression is an expression that is valid in accordance with the rules of the second grammar of structured text, can be evaluated to form a number and, by way of example, describes an addition or a multiplication. For the description of the G code word comprising the ST expression, the combined grammar comprises the second embedding rule, according to which a derivation of the nonterminal symbol "G code word" can also comprise, instead of the basic symbol "decimal number", a nonterminal symbol "ST expression" associated with the second programming language. The nonterminal symbol "ST expression" is represented, according to the rules of the second grammar of structured text, by character sequences of the input program code 300 that represent basic symbols of the language structured text and are included in the second program code component.

The number for which the ST expression can be evaluated can in this case have all the number types that are valid in structured text, that is to say, by way of example, "Real", "LReal", "Int" or "USInt", and data types that are convertible into such number types according to the rules of the language structured text, that is to say list types or value range types (subrange), for example. The translation module 210 is configured to have the number type of the number converted into a format that is valid in G code, for example "LReal", if need be, for which purpose the relevant rules of the language structured text can be applied, for example.

The ST expression can comprise, in accordance with the second grammar of structured text, not only numbers, named variables and operators, but also parenthesized expressions. Furthermore, the ST expression can also comprise field variables (array), composite variables (struct) or calls to named functions having formal parameters. The translation module 210 may be configured to also process, during the processing of the input program code 300, character sequences of the type ST expression that comprise predefined variables intended to be stored in the memory 120.

The second embedding rule thus describes an embedding of structured text into G code. The input program code 300 can comprise, in the character sequence of the G code word at a point at which there is, in accordance with the first grammar, a character sequence representing the basic symbol "G decimal number" associated with the first programming language, character sequences formed in accordance with the second grammar that represent the nonterminal symbol "ST expression" associated with the second programming language.

The combined grammar of the combination language formed from G code and structured text stipulates that in a G code expression that forms the value of a G code word it is also possible to use an ST variable instead of a decimal number. In this case, the ST variable is a named variable that is valid according to the rules of the second grammar of the second programming language structured text and that represents a numerical value. The variable embedding rule of the combined grammar therefore stipulates that a derivation of the nonterminal symbol "G expression" can also comprise a nonterminal symbol "ST variable" at the points at which there may be the basic symbol "G decimal number". The nonterminal symbol "ST variable" can be derived to form a basic symbol "G descriptor" that represents a literal formed in accordance with the basic symbol specification of structured text, the literal being the name of the variable. The basic symbol "G descriptor" is associated with the first programming language, that is to say is comprised by the first program code component of the input program code 300.

The ST variable may be a local variable, a global variable or a function parameter of a function. The declaration of the variable or the definition of the function is included in the second program code component of the input program code 300, which second program code component is written in the language structured text, that is to say in the second programming language.

The variables that are used in the ST expressions and the G code expressions, and the functions that are used in the ST expressions, can be declared or defined at any point in the second program code component of the input program code 300. In particular, the variables or functions do not have to be defined within the contiguous character sequence of the ST expression in which they are used. The translation module 210 is configured to link the variables and functions during the processing of the input program code 300 in accordance with a second semantic system of the second programming language structured text.

Instead of an instruction, the input program code 300 can also include declarations. This includes declarations of data types, variables and functions. The declaration of a variable or of a function can itself in turn include an instruction or multiple instructions.

For the processing of the input program code 300, the translation module 210 comprises a resolution module 212. The resolution module 212 is configured to read in the input program code 300 and to convert it into a data stream of basic symbols 308, that is to say to execute the lexical analysis of the input program code 300. The basic symbols 308 can also be referred to as "tokens" and the resolution module 308 can be referred to as a "scanner". The basic symbols 308 respectively represent the smallest meaningful units of the input program code 300, for example numbers, keywords, variable descriptors, operators and constants.

The resolution module 212 is configured to convert the character sequences of the first program code component written in the first programming language into basic symbols of the first programming language and to convert the character sequences of the second program code component written in the second programming language into basic symbols of the second programming language.

The resolution module 212 reads in the input program code 300 character by character and produces, for each character sequence that corresponds to one of the basic symbols, an instance of the respective basic symbol for forwarding via the data stream of the basic symbols 308. During the conversion of the input program code 300 into the basic symbols 308, the resolution module 212 respectively adopts precisely one state from a finite set of states. In particular, the resolution module 212 is configured to adopt a first state and a second state. The resolution module 212 may be configured as a finite, deterministic machine, for example.

In this case, the states of the resolution module 212 determine, inter alia, whether the resolution module 212 associates a read-in character sequence of the input program code 300 with a basic symbol of the first programming language or a basic symbol of the second programming language. In particular, the resolution module 212 converts the input program code 300 into basic symbols of the first programming language in the first state and into basic symbols of the second programming language in the second state.

The input program code 300 can comprise an ambiguous character sequence that corresponds both to a basic symbol of the first programming language in accordance with the first basic symbol specification and to a basic symbol of the second programming language in accordance with the second basic symbol specification. By way of example, the ambiguous character sequence can comprise a character that, in accordance with the first programming language, is associated with a basic symbol that introduces a comment and, in accordance with the second basic symbol specification, is associated with a basic symbol that introduces a parenthesized expression. If the first programming language is G code and the second programming language is structured text, then the ambiguous character sequence comprises the character "(", for example, in such a case.

A further ambiguous character sequence that can represent both a basic symbol of the first programming language and a basic symbol of the second programming language may be, by way of example, a literal, for example a number or a string formed from a series of digits. If the resolution module 212 is in the first state when the ambiguous character sequence is read in, then it converts the ambiguous character sequence into a corresponding basic symbol of the first programming language. If it is in the second state, then it converts the ambiguous character sequence into a corresponding basic symbol of the second programming language.

The basic symbols 308 of the first and second programming languages comprise a piece of information about the programming language with which they are respectively associated. As a result, modules of the translation module 210 that process the data stream comprising basic symbols 308 further can take this information into consideration.

The resolution module 212 is configured to execute state transitions between the states, that is to say to change from one state to another state, when control sequences are read in from the input program code 300. The control sequences are character sequences that can comprise a character or multiple characters. If a control sequence prompts a state transition from one state, in which the input program code 300 is converted into basic symbols 308 of the first programming language, into another state, then the relevant control sequence can consist of a character sequence that, in accordance with the first basic symbol specification, has no associated basic symbol of the first programming language. Analogously, a control sequence that prompts a state transition from one state, in which the input program code 300 is converted into basic symbols 308 of the second programming language, into another state can consist of a character sequence that, in accordance with the second basic symbol specification, has no associated basic symbol of the second programming language.

By way of example, one of the control sequences can respectively consist of a single special character that has an associated basic symbol neither in the first nor in the second programming language. This does not preclude a character sequence comprising multiple characters that comprises the special character used as a control sequence from having an associated basic symbol. By way of example, the special character used as a control sequence may be part of a literal comprising multiple characters, for example part of a string, in which case no state transition is initiated when the literal is read in.

A control sequence can also consist of a character sequence that has an associated basic symbol in the programming language from which it initiates a state transition. In this case, the resolution module 212 produces the corresponding basic symbol and executes the state transition when the control sequence is read in.

The resolution module 212 may, by way of example, be configured to retain the state to which it has changed after a control sequence has been read in until the end of the line that contained the control sequence. It may also be configured to retain the state until a further control sequence has been read in. The further control sequence may be the same control sequence as the one previously read in or a different control sequence than the control sequence previously read in.

Figure 3:
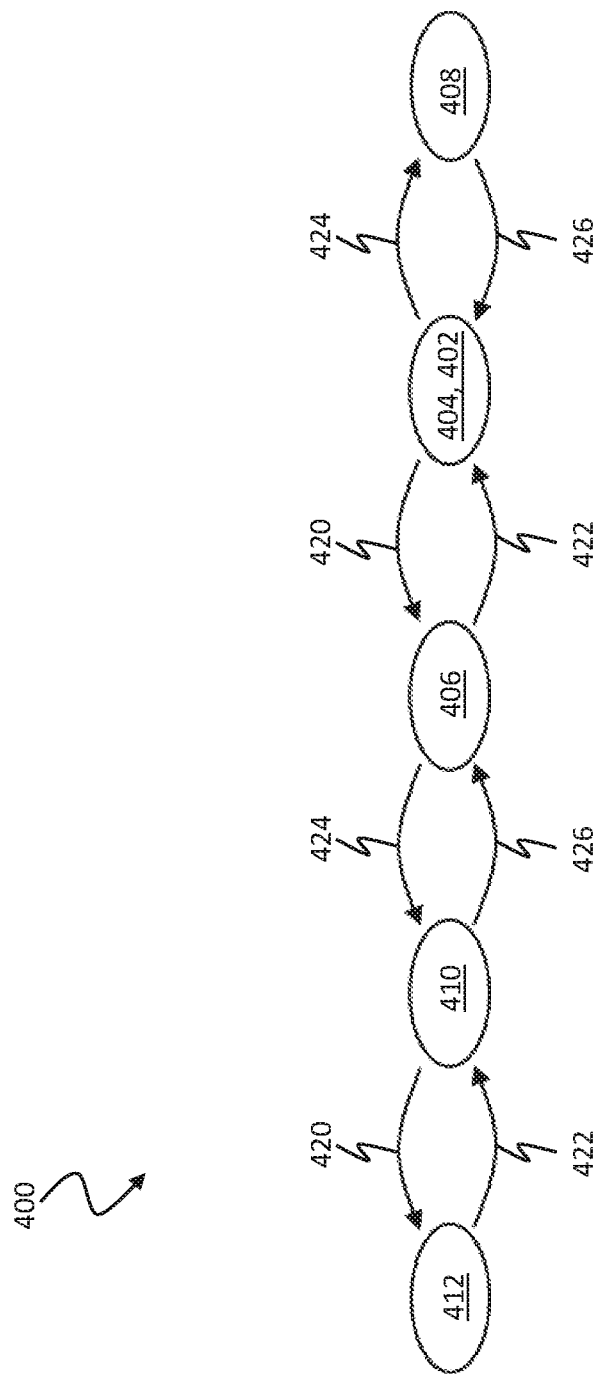
FIG. 3 shows a state transition diagram of the translation module of the machine control.

FIG. 3 shows a state transition diagram 400 that describes possible states of the resolution module 212, and also transitions between these states. The resolution module 212 can adopt a first state 404, a second state 406, a third state 408, a fourth state 410 and a fifth state 412. In the first state 404 and the fourth state 410, the resolution module 212 converts the character sequences of the input program code 300 into basic symbols 308 of the first programming language, and in the second state 406, the third state 408 and the fifth state 412, it converts them into basic symbols 308 of the second programming language.

At the beginning of the read-in of the input program code 300, the resolution module 212 is in the first state 404, which is an initial state 402. In the first state 404, the resolution module converts the input program code 300 into basic symbols 308 of the first programming language. The input program code 300 therefore has to begin with a first character sequence of the first program code component, which first character sequence is written in the first programming language. The first character sequence may also be blank. After the first character sequence, the input program code 300 can comprise a first control sequence 420, followed by a second character sequence of the second program code component, which second character sequence is composed in the second programming language.

After the first control sequence 420 is read in, the resolution module 212 changes from the first state 404 to the second state 406. A second character sequence of the second program code component of the input program code 300, which second character sequence follows the first control sequence 420, is consequently converted into basic symbols 308 of the second programming language. The resolution module 212 remains in the second state 406 until it reads in a second control sequence 422 that follows the second character sequence. After the second control sequence 422 is read in, the resolution module 212 changes back from the second state 406 to the first state 404.

Instead of the first control sequence 420, the input program code 300 can also include a third control sequence 424 between the first character sequence and the second character sequence. The resolution module 212 is configured to change to the third state 408 when it reads in the third control sequence 424 while it is in the first state 404. A change by the resolution module 212 back to the first state 404 takes place after a fourth control sequence 426 is read in, which fourth control sequence is formed by the line end of the line of the input program code 300 that comprises the third control sequence 424.

The input program code 300 can also include the third control sequence 424 too between the first control sequence 420 and the second control sequence 422. If the resolution module 212 is in the second state 406 after the first control sequence 420 is read in, and if it reads in the third control sequence 424 in the second state 406, then the resolution module 212 changes to the fourth state 410, that is to say converts a read-in character sequence into basic symbols 308 of the first programming language, for the remainder of the currently read-in line of the input program code 300. After the fourth control sequence 426, formed by the line end of the line including the third control sequence 424, is read in, there is again a return to the third state 406.

Between the third control sequence 424, which follows the first control sequence 420, and the fourth control sequence 426, the input program code 300 can also comprise the first control sequence 420 and the second control sequence 422 too. While the resolution module is in the fourth state 410, the resolution module 212 executes a state transition to the fifth state 412 when the first control sequence 420 is read in, and converts the read-in input program code 300 into basic symbols 308 of the second programming language until it in turn reads in the second control sequence 422 and changes back to the fourth state 410.

If the input program code 300 has a line end between the first control sequence 420, which follows the first control sequence 420 and the third control sequence 424, and the subsequent second control sequence 422, and if the resolution module 212 in the fifth state 412 reads in the line end before it has read in the second control sequence 422, then the resolution module 212 terminates the read-in of the input program code 300 and outputs an error message. Error messages that are output by the resolution module 212 or by other modules of the machine control 200 can be transferred to the server control module 110, for example, and from the latter to the PLC module 30.

The resolution module 212 may also be configured to execute the transition from the second state 406 to the third state 410 after a control sequence different than the third control sequence 424 is read in. Similarly, it may be configured to execute the transitions from the fourth state 410 to the fifth state 412 and back to the fourth state 410 after control sequences respectively different than the first control sequence 420 and the second control sequence 422 are read in.

The resolution module 212 may also be configured to adopt not only the depicted states 404, 406, 408, 410, 412 but also further states. By way of example, the resolution module 212 may be configured to change from the second state 406 after the first control sequence 420 is read in again, to a further state, in which it converts read-in character sequences of the input program code 300 into basic symbols 308 of the first programming language and from which it changes back to the second state 406 after the second control sequence 422 is read in.

If the first programming language is the language G code and the second programming language is the language structured text, then the first control sequence 420 can consist of the special character "{", the second control sequence 422 can consist of the special character "}", the third control sequence 424 can consist of the special character "!" and the fourth control sequence 426 can consist of the line end, for example. In this case, neither the first control sequence 420 nor the second control sequence 422 or the third control sequence 424, by themselves, represent basic symbols of the language G code or the language structured text. However, the first, second or third control sequence 420, 422, 424 may respectively be included in a string of the second programming language structured text. In this case, the read-in of the first, second or third control sequence 420, 422, 424 does not initiate a state transition by the translation module 210.

The fourth control sequence 426, which is provided by the line end, does not represent a basic symbol in the second programming language structured text, but rather is treated as blank space when the input program code 300 is read in. In this respect, a read-in of the fourth control sequence 426 in the third state 408 initiates a state transition back to the first state 404, but with the resolution module 212 not producing a basic symbol.

In the first programming language G code, the line end represents the basic symbol "G-Newline", on the other hand. The basic symbol "G-Newline" indicates the end of a G code sentence and if need be the beginning of a subsequent G code sentence. Therefore, if the resolution module 212 in the fourth state 410, in which it converts read-in character sequences into basic symbols of the first programming language G code, reads in the fourth control sequence 426 formed by the line end, it produces the basic symbol "G-Newline" and executes a state transition back to the second state 406. If, by contrast, the resolution module 212 in the first state 404, in which it likewise produces basic symbols of the first programming language G code, reads in the line end, then it merely produces the basic symbol "G-Newline", but does not execute a state transition.

The translation module 210 comprises a parser module 216 that is configured to process the data stream comprising basic symbols 308 and to create a uniform structure tree 314 from the basic symbols 308. In this case, the uniform structure tree 314 is produced according to the rules of the combined grammar that describes the combination of the first programming language with the second programming language. It comprises all the basic symbols 308 produced by the resolution module 212. The uniform structure tree 314 can also be referred to as a parse tree or derivation tree.

A node of the uniform structure tree 314 that represents a nonterminal symbol of the second programming language may be connected to a child node of the structure tree 314 that represents a basic symbol or a nonterminal symbol of the first programming language. Analogously, a further node of the structure tree 314 that represents a nonterminal symbol of the first programming language may be connected to a further child node that represents a basic symbol or a nonterminal symbol of the second programming language. This is the case particularly for the parts of the uniform structure tree 314 that are described by the first embedding rule, the second embedding rule or the variable embedding rule.

Generally, the uniform structure tree 314 can comprise a first subtree and a second subtree. In this case, the first subtree has nodes that represent symbols, that is to say nonterminal symbols or basic symbols, of the first programming language. A node of the first subtree is connected to a second subtree that has nodes that represent symbols of the second programming language. In other words, the first subtree is associated with the first programming language and comprises a second subtree that is associated with the second programming language. Analogously, the uniform structure tree 314 can also comprise a subtree that is associated with the second programming language and that comprises a subtree associated with the first programming language.

A part of the uniform structure tree 314 that is produced according to the first embedding rule for combining the programming languages G code and structured text comprises a node that represents the nonterminal symbol "instructions". A subtree of this node can include both a node that represents a nonterminal symbol "ST instruction" formed according to the rules of the second grammar and a node that represents a nonterminal symbol "G code sentence" formed according to the rules of the first grammar.

A part of the uniform structure tree 314 that is produced according to the second embedding rule for combining the programming languages G code and structured text comprises a node that represents the nonterminal symbol "G code sentence". This node is connected firstly to a node that represents the basic symbol "address letter" and secondly to a node that represents a nonterminal symbol "ST expression" formed according to the rules of the second grammar. The node for "G code sentence" may in this case be connected to the node for "ST expression" either directly or via one or more further nodes.

A part of the uniform structure tree 314 that is produced according to the variable embedding rule for combining the programming languages G code and structured text comprises a node that represents the nonterminal symbol "G code word" associated with the first programming language. If the variable embedding rule stipulates that the nonterminal symbol "G code word" comprises the nonterminal symbol "ST variable" associated with the first programming language, then this node is connected firstly to a node that represents the basic symbol "address letter" associated with the first programming language and secondly to a node that represents the nonterminal symbol "ST variable" associated with the first programming language. The nonterminal symbol "ST variable" is connected to a node that represents the basic symbol "G descriptor", which is the name of the ST variable.

If the variable embedding rule stipulates that a derivation of the nonterminal symbol "G expression" associated with the first programming language can comprise the nonterminal symbol "ST variable" associated with the first programming language, then a node that represents the nonterminal symbol "G expression" may be connected firstly to a node that represents the basic symbol "decimal number" associated with the first program language or a further nonterminal symbol "G expression" formed according to the rules of the first grammar and secondly to a node that represents the nonterminal symbol "ST variable" associated with the first programming language. The nonterminal symbol "ST variable" is connected to a node that represents the basic symbol "G descriptor", which is the name of the ST variable.

The parser module 214 is configured to execute a syntactic analysis of the input program code 300, in connection with the creation of the uniform structure tree 314, using the combined grammar. In particular, the first program code component written in the first programming language is then checked for conformity with the first grammar and the second program code component written in the second programming language is checked for conformity with the second grammar. In addition, the parser module is configured to check the input program code 300 for conformity with the rules that describe the combination of the first programming language with the second programming language, that is to say particularly with the first embedding rule, with the second embedding rule and with the variable embedding rule. The parser module 214 of the translation module 210 can be executed at the actual loading time for the control program, for example, so that a complete syntactic check on the input program code 300 is concluded before the actual execution of the intermediate representation 320 by the processing module 230.

The translation module 210 comprises an analysis module 216. The analysis module 216 is configured to perform a semantic check or a semantic analysis on the input program code 300 by semantically analyzing the uniform structure tree 314 produced by the parser module 214. The analysis module 216 is additionally configured to forward the uniform structure tree 314 together with semantic information 316 obtained during the semantic analysis to a memory allocation module 218. In this respect, the analysis module 216 outputs a decorated or attributed structure tree.

The analysis module 216 is configured to perform the semantic analysis using a combined semantic system that comprises stipulations of a first semantic system of the first programming language and stipulations of a second semantic system of the second programming language. The semantic analysis involves the analysis module 216 establishing the data types of all data objects comprised by the uniform structure tree 314, for example, and extending the relevant nodes by the data type. In the case of numbers, this can involve the data types "Int" and "LReal", for example. Following the semantic analysis, the uniform structure tree 314 thus also comprises information about the data types of the included data objects.

Furthermore, the analysis module 216 checks, inter alia, the input program code 300 represented by the uniform structure tree 314 for type purity. This involves it checking parts of the uniform structure tree 314 that are based on the first program code component of the input program code 300 for type purity using stipulations of the first semantic system. Analogously, it checks parts of the uniform structure tree that are based on the second program code component of the input program code 300 for type purity using stipulations of the second semantic system. For parts of the structure tree that are based on the first embedding rule, the second embedding rule or the variable embedding rule, the combined semantic system can include additional stipulations that describe possible combinations of data types of the first programming language and the second programming language.

Beside the type check, the analysis module 216 performs name linking for variables used and named functions, and also for the parameters thereof. If merely the second programming language comprises named variables or functions, this name linking can be effected in accordance with the second semantic system of the second programming language, for example. The combined semantic system stipulates, inter alia, that all the variables and functions used in the input program code 300 are comprised by a uniform name space. As a result, the input program code 300 can comprise, for example in a code section, a named variable that has been declared in another code section separate from this code section. The two code sections may be composed in the second programming language, for example, and separated from one another by a code section that is composed in the first programming language and marked by control sequences.

The translation module 210 is configured to execute the semantic analysis of the input program code 300 at the loading time for the control program, that is to say that a static semantic analysis of the input program code 300 is effected.

The memory allocation module 218 of the translation module 210 is configured to allocate memory addresses of the memory 120 of the control system 1 to those variables and parameters of functions that are used in the input program code 300. The memory address may be an absolute memory address of the memory 120, for example when the memory address is associated with a global variable. The memory address may also be a relative memory address that is defined on the basis of another memory address of a superordinate data structure. A relative memory address can be used for a local variable, for example, and the relative memory address may be defined on the basis of a memory location of a function call to a function that includes the variable, for example. The relative memory address can also be used for a parameter of a function, the relative memory address likewise being defined on the basis of a memory location of a function call to the function.

In this case, the memory addresses of the memory 120 are allocated for all variables included in the input program code 300 or in the uniform structure tree 314. The intermediate representation 320 produced by the translator module 210 therefore has no variable descriptors, but rather now only memory addresses. The memory addresses are thus allocated before execution of the intermediate representation 320 of the control program, for example said memory addresses can be allocated at the loading time for the control program.

Following allocation of the memory addresses, the memory allocation module 218 transmits the uniform structure tree 314 with the information about the memory addresses and the semantic information 316 to an intermediate representation production module 219. The intermediate representation production module 219 is configured to produce the uniform intermediate representation 320 from the uniform structure tree and the structure tree 314, the semantic information 316 and the information about the memory addresses. In this case, production of the intermediate representation 320 may be concluded before execution of the intermediate representation 320 by the processing module 230 of the machine control 200.

The intermediate representation 320 comprises the control program depicted by the input program code 300 as a series of work instructions that are executed sequentially by the processing module 230. In this case, the work instructions respectively comprise information about the data types on which they operate. By way of example, a work instruction that manipulates a number can include information about whether this is a number of "Int", "LReal" or "Real" type. Consequently, for an operation, for example for an addition, there is a respective dedicated type of work instructions for every possible data type of the numbers involved.

For the execution of the intermediate representation 320 and for the production of the data stream of core-specific control commands 338, the processing module 230 comprises an execution module 232, an NC processor 234, a sorting module 236 and an NC core adapter module 238.

The execution module 232 is configured to take the work instructions of the intermediate representation 320 as a basis for producing a data stream of NC instructions 330 and to transfer it to the NC processor 234. The NC processor 234 in turn is configured to take the NC instructions 330 as a basis for producing a data stream of control commands 334.

The control commands 334 can include, inter alia, the movement instructions that describe the machine movements to be executed by the machine 2. The machine movements may be tool paths, for example, along which a machining tool of the machine 2 is moved. As described in connection with FIG. 1, the movement instructions of the control commands 334 are described by geometric elements, the geometric elements being defined by a set of geometric parameters.

The NC instructions 330 produced by the execution module 232 can be expressed completely in one of the two programming languages used for writing the input program code 300, namely in the first programming language. If the second programming language is a programming language having high-level language elements, such as variables, named functions having formal parameters or control flow instructions, then the execution module 232 executes work instructions based on these high-level language elements completely during the processing of the intermediate representation 320. The execution of a work instruction that is based on a control flow instruction can result in the execution module 232 not executing the next work instruction that follows the relevant work instruction, but rather skipping within the intermediate representation 320 to another work instruction and continuing the execution of the work instructions from this other work instruction.

For the execution of work instructions that have been created from code sections having variables, the execution module 232 accesses a memory address of the memory 120 that is associated with the relevant variable. The access to the memory 120 can be effected both on the shared memory area 122 and on the local memory area 124. During the memory access, the execution module 232 can write data to the memory 120 or read data from the memory 120.

The NC instructions 330 produced by the execution module 232 are transferred as a data structure to the NC processor 234, for example the NC instructions 330 can be transferred as binary-coded data structures. The NC instructions 330 created from the work instructions of the intermediate representation 320 are converted into the control commands 334 by the NC processor 234 without memory access operations on the memory 120 or evaluations of variables. In this case, the NC instructions 330 are handled by the NC processor 234 purely sequentially, that is to say that there are particularly no control flow instructions evaluated or program jumps executed.

The NC processor 332 may also be configured to adopt different states for the handling of the NC instructions 330 and the production of the control commands 334, that is to say during the runtime of the control program represented by the input program code 300. The state of the NC processor 332 can represent, by way of example, coordinate systems in which the NC processor 234 evaluates movement instructions of the NC instructions 330, coordinate transformations that are applied to the movement instructions of the NC instructions 330, feed rates at which movement instructions of the NC instructions 330 are meant to be executed, definitions of tool sets, type and codes of a currently used tool or a current tool position. The state of the NC processor 234 can also comprise a zero point displacement to be applied to the movement instructions.

The execution module 232 is configured to alter the state of the NC processor 332 during the runtime of the control program. The change of state can be initiated by a single one or a series of the NC instructions 330 transferred to the NC processor. If the change of state cannot be expressed in the first programming language, then the change of state can also be initiated by the execution module 232 by virtue of an additional instruction being transferred to the NC processor 234, which additional instruction is not compliant with the first programming language. The change of state can be initiated both by work instructions that are based on a character sequence of the first programming language that is included in the first program code component of the input program code 300 and also by those based on a character sequence of the second programming language that is included in the second program code component of the input program code 300.

In addition to the execution module 232, the server control 110 may also be configured to change the state of the NC processor 234. Using the server control 110 and the server control channel 58, it is therefore also possible for the PLC module 30 to alter the state of the NC processor 234.

The execution module 232 is configured to receive status information 332 from the NC processor 234. The status information 332 comprises information about the instantaneous state of the NC processor 234 and can, by way of example, also include information about the number of NC instructions 330 yet to be converted into control commands 334. The execution module 232 is therefore configured to handle work instructions of the intermediate representation 320 that take into consideration the status that the NC processor 234 respectively adopts at the execution time of the relevant work instructions.

If the first programming language is the language G code, then the execution module 232 may be configured, by way of example, to transfer the NC instructions 330 as data structures to the NC processor 234, these being able to be expressed by G code. This can involve standard-compliant G code according to ISO 6983 or standard-compliant G code that has been extended by additional language elements. In such a case, the NC processor 234 may be configured as a G code translator or G code interpreter, for example, that is configured to process G code and, apart from the differences described, behaves in the manner of a conventional G code control.

G Code consists of a series of G code words respectively having an address letter and a value. The NC instructions 330 may therefore respectively be coded as an element of a data array, each element of the data array respectively including a data pair that consists of the address letter of the G code word and the numerical value of the value of the G code word. The data array may be binary-coded, for example. The data array of an NC instruction 330 may respectively be a G code sentence, for example, that is to say a series comprising a G code word or comprising multiple G code words.

By way of example, a character sequence "G01 X100 Y40 F42" describes a G code sentence that comprises a series of four character sequences that respectively represent nonterminal symbols "G code word" with the address letters "G", "X", "Y" and "F", and also the values "01", "100", "40" and "42". The G code sentence describes a linear movement with a defined feed of 42 to a position having coordinates X=100 and Y=40. It can be described by an NC instruction 330 having the data pairs "G, 01", "X, 100", "Y, 40" and "F, 42".

For the production of one of the NC instructions 330 that represents a series of G code words, the intermediate representation 320 comprises work instructions according to which the execution module 232 first of all computes all the values in the series. Furthermore, the intermediate representation 320 comprises concluding work instructions, according to which the execution module 232 sequentially writes all data pairs that respectively consist of the address letter and the numerical value computed for the respective address letter to the data structure representing the NC instruction 330 and transfers the data structure to the NC processor 234. In this case, for every G code sentence that the input program code 300 comprises, for example, it is respectively possible for one of the NC instructions 330 to be produced and transmitted to the NC processor.

The NC processor 234 interprets the G code represented by the NC instructions 330 and converts the NC instructions 330 into the control commands 334. In this case, the states of the NC processor 234 define, inter alia, the manner in which the NC instructions 330 are converted into movement instructions or manufacturing instructions. In a first processor state of the NC processor 234, the NC instructions 330 are converted into control commands 334 that depict a straight line that is to be linearly interpolated, for example. In a second processor state of the NC processor 234, the NC instructions 330 are converted into control commands 334 that depict arcs of a circle that are to be interpolated clockwise. In a third processor state of the NC processor 234, the NC instructions 330 are converted into control commands 334 that depict arcs of a circle that are to be interpolated anticlockwise.

The NC processor 234 is put into the first processor state by an NC instruction 330 that comprises the data pair "G, 1". The NC processor 234 is put into the second processor state by an NC instruction 330 that comprises the data pair "G, 2", and it is put into the third processor state by an NC instruction 330 having the data pair "G, 3". After reception of the respective NC instruction, the NC processor 234 interprets all subsequent NC instructions that depict coordinates, either "X" or "Y", as coordinate values of the geometric parameters associated with the respective geometric element.

Furthermore, the state of the NC processor 234 can comprise a coordinate transformation to be applied to the NC instructions 330, for example. The control commands 334 that are output by the NC processor 234 can be evaluated without taking into consideration the states of the NC processor 234 that are provided in the programming language G code. As such, the control commands 334 respectively comprise, for every movement instruction, both information about the geometric element representing the movement and coordinate values of the geometric parameters of the geometric element that are depicted in a stipulated coordinate system, for example.

In the case of an alternative refinement of the processing module 230, the execution module 232 may also be configured to produce the NC instructions 330 such that they can be expressed in a programming language other than the first. By way of example, the NC instructions 330 can be expressed completely in the second programming language or in a third programming language that is different than the first and second programming languages. The third programming language may be a programming language for programming robots, for example, such as VAL, Rapid or KRL. In these cases too, the NC processor 234 may be configured in a manner that is optimized for the processing of instructions composed in the relevant programming language.

The execution module 232 is furthermore configured to produce a data stream of further control commands 335. The further control commands 335 are, unless differences are described, configured in the manner of the control commands 334. The further control commands 335 can comprise movement instructions that cannot be expressed in the first programming language, for example. By way of example, such movement instructions may be based on non-standard-compliant geometric elements that the first programming language does not comprise. If the first programming language is the language G code, then a non-standard-compliant geometric element may be a three dimensional helical line, for example, that is to say a superimposition of a rotation about an axis of rotation with a linear movement along the axis of rotation. In this case, the helical line may also comprise multiple revolutions. The axis of rotation does not have to be perpendicular to a main plane of a coordinate system used for controlling the machine 2 in this case.

The production of the further control commands 335 can be effected on the basis of work instructions that have been created from the second program code component of the input program code 300 that is composed in the second programming language. This can involve functions provided for producing the further control commands 335 being called, for example.

The data stream of control commands 334 and the data stream of further control commands 335 are transferred from the NC processor 234 and the execution module 232 to the sorting module 236. The sorting module 236 is configured to transfer the control commands 334 and the further control commands 335 as a data stream of control commands 336 organized in an order of actuation to an NC core adapter module 238. In this case, the order of actuation is the order in which the control commands 334 and the further control commands 335 are sequentially handled by the NC channel module 22 and converted into setpoint values and supplementary commands for the machine 2.

By way of example, the order of actuation may be that order in which the work instructions of the intermediate representation 320 that form the basis for the control commands 334 and the further control commands 335 are handled by the execution module 232. The concurrent production of the control commands 334 and the further control commands 335 by the NC processor 234 and the execution module 232 can result, on account of different processing times in the NC processor 234 and the execution module 232, in a control command that is intended to be executed later by the NC channel module 22 being produced and transferred to the sorting module 236 before a control command that is intended to be executed earlier by the NC channel module 22. In such a case, the sorting module 236 detains the control command intended to be executed later until the control command intended to be executed earlier is received, and first of all transmits the control command intended to be executed earlier and only then the control command intended to be executed later as organized control commands 336 to the NC core adapter module 238.

The NC core adapter module 238 is configured to convert the organized control commands 336 into the core-specific control commands 338. The core specific control commands 338 are, unless differences are described, configured in the manner of the control commands 334 or the further control commands 335. The core specific control commands 338 are produced by the NC core adapter module 238 in a data format that matches the data interface via which the NC core 20 receives the core specific control commands 338. By way of example, the core specific control commands 338 may be configured to be transferred by means of data telegrams, particularly by means of ADS data telegrams of a TwinCat control system.

The NC core adapter module 238 is furthermore configured to combine multiple control commands of the data stream of organized control commands 336 in one of the core specific control commands 338. Similarly, the NC core adapter module 238 is configured to remove redundant or surplus control commands of the data stream of organized control commands 336 from the data stream, so that they are not converted into core specific control commands 338. A control command of the data stream of organized control commands 336 can also be transformed into multiple instances of the core specific control commands 338.

The further control commands 335 produced by the execution module 232 can also comprise an NC synchronization control command by means of which the processing module 230 and the NC core 20 or the NC channel module 22 are synchronized to one another. The NC synchronized control command is used to transfer a request to the NC core 20 to report the conclusion of the processing of all the core specific control commands 338 transferred up to this time. At the same time, the handling of the intermediate representation 320 by the execution module 232 is blocked. After all available core specific control commands 338 have been handled by the NC core 20, the NC core 20 sends an appropriate message or a signal via the NC core status message channel 56 to the server control module 110. The server control module 110 subsequently prompts lifting of the blockade on the execution module 232.

Analogously to the synchronization between processing module 230 and NC core 20, the further control commands 335 can also be used to effect synchronization between the processing module 230 and the PLC module 30. In this case, the execution module 232 requests a message or a signal via the control command channel 52, the NC core 20 and the interchange channel 40 from the PLC module 30 and blocks the handling of the intermediate representation 320 by the execution module 232. The message can be requested on the basis of a work instruction of the intermediate representation, for example. The PLC module 30 sends the requested message via the server control channel 58 to the server control module 110. The server control module 110, after receiving the message, prompts lifting of the blockade on the execution module 232. The sending of the message requested by the execution module 232 may in this case be dependent on an event detected by the PLC module 30, for example.

Alternatively, the blockade on the execution module 232 can also be initiated by the PLC module 30 via the server control module 110 and lifted again by the server control module 110 after reception of the message sent by the PLC module 30. For the blocking of the execution module 232, it is possible for a semaphore to be used, for example, which the execution module 232 and the server control module 110 access. The messages or signals from the PLC module 30 and the NC core 20 alter the counter of the semaphore in this case in order to block the execution or to decontrol a blocked execution again.

The execution module 232 of the processing module 230 may be configured as what is known as a stack machine, for example. In such a case, the work instructions of the intermediate representation 320 represent instructions intended to be handled sequentially that manipulate data elements of a runtime stack. In this case, the runtime stack may be realized in the memory 120, particularly in the local memory area 124. The runtime stack is a "last-in-first-out" (LIFO) memory in which the data elements stored in the runtime stack are removed again in the opposite order and the execution module 232 can respectively access the topmost data element, that is to say the most recent one still in the memory.

Figure 4:
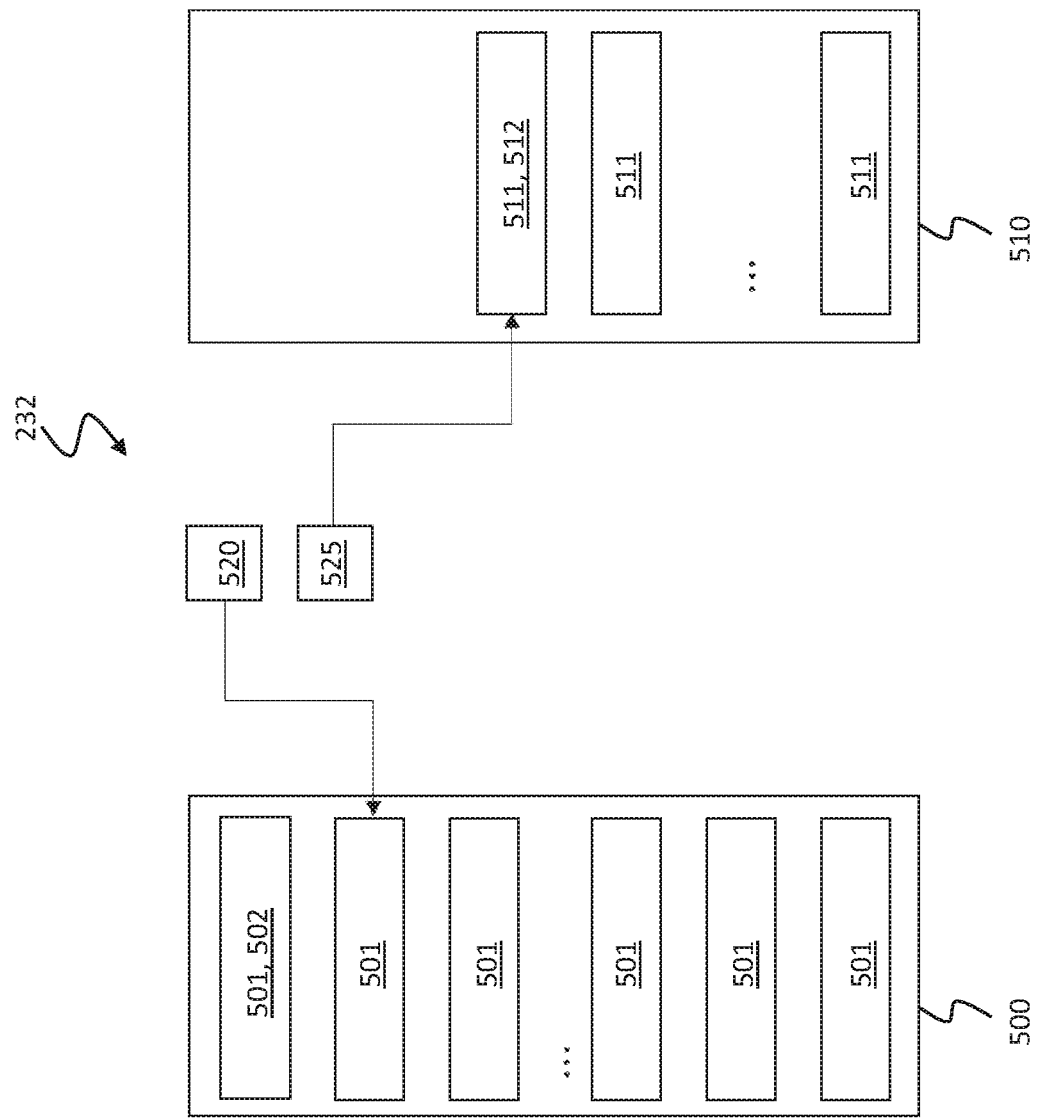
FIG. 4 shows a schematic depiction of the execution module of the machine control.

FIG. 4 shows a schematic depiction of the execution module 232 configured as a stack machine, which comprises a program memory 500 and a runtime stack 510.

The program memory 500 includes a series of work instructions 501 of the intermediate representation 320, which series is produced by the translation module 210 when the input program code 300 is loaded. A program counter 520 of the execution module 232 respectively points to the work instruction 501 that is to be handled next. At the beginning of the execution of the intermediate representation 320, the program counter 520 points to a first work instruction 502. After one of the work instructions 501 is handled, the program counter 520 is set to the work instruction that is to be handled next. Normally, this is the work instruction that comes next in the series. In the event of a program jump, for example on account of a control flow instruction, the work instruction to be handled next may also be a different work instruction than the one that comes next. In this case, the different work instruction may be included in the series of work instructions 501 before or after the work instruction that initiates the program jump.

The runtime stack 510 includes a series of data elements 511. The work instructions 501 respectively prescribe the manner in which the data elements 511 stored in the runtime stack 510 are intended to be manipulated. In this respect, the work instructions 501 are respectively stack instructions that operate on the runtime stack 510. At the beginning of the execution of the intermediate program code 320, the runtime stack 510 is empty and none of the data elements 511 are in the runtime stack 510. The execution of the work instructions 501 can result in the execution module 232 accessing the runtime stack 510 and one of the data elements 511 being stored in the runtime stack 510 or being removed from the runtime stack 510.

It is always a topmost data element 512 added last and not yet removed again that is accessed in this case. To that end, a stack pointer 525 of the execution module 232 respectively points to the topmost data element 512. In the event of read access to the runtime stack 510, the topmost data element 512 is read in and the stack pointer 525 is set to the data element below it, that is to say to the next most recent of the data elements that are present in the runtime stack 510. If the intention is for a further data element to be stored in the runtime stack 510, then the relevant data element is written to the runtime stack 510 and the stack pointer 525 is set to the freshly written data element.

During the execution of the work instructions 501, the execution module 232 successively executes multiple method steps. First, data access to the runtime stack 510 can be effected and one or more of the data elements 511 can be read from the runtime stack 510. Subsequently, computations can be performed that involve the removed data elements being used and the one or more new data elements being produced as results. Additionally, side effects that are not connected to manipulation of the runtime stack 510 can be initiated. The side effects comprise production of an NC instruction 330 or of one of the further control commands 335, for example. Thereafter, the one or more results of the computation can be stored in the runtime stack 510. Finally, the program counter 520 can be reset and the execution of further work instructions 501 by the execution module 232 can be blocked if need be. During the execution of the work instructions 501, it is also possible for a data element removed from the runtime stack 510 to be written to the memory 120 or for a data element included in the memory 120 to be stored in the runtime stack 510.

The processing module 230 may be of object-oriented design and operation. The intermediate representation 320 includes the work instructions 501 in such a case as a list of pointers to instruction objects. The pointers are stored in the program memory 500 as work instructions. The classes of the instruction objects respectively define methods that implement method steps for execution of the work instructions of the intermediate representation 320. In this case, the methods may be available as machine code of a computer system executing the control system 1. The instruction objects may furthermore have attributes that comprise a constant to be loaded into the runtime stack 510, for example, and are set when the intermediate representation 320 is produced. The attributes can also comprise the address letters of the G code word of an NC instruction 330 to be produced. The attributes can be read by the methods when they are executed, for example.

For object-oriented execution of the processing module 230, the NC instructions 330, the control commands 334, the further control commands 335 and the organized control commands 336 are also realized as data objects. These data objects are respectively transferred between the execution module 232, the NC processor 234, the sorting module 236 and the NC core adapter module 238 by virtue of pointers being conveyed to the respective data objects. The NC core adapter module 238 respectively destroys the data objects that represent the organized control commands 336 and produces the core specific control commands 338 for transfer via the data transfer channel 50.

The text below describes the conversion of the input program code 300 into the work instructions 501 of the intermediate representation 320 and the execution of the intermediate representation 320 by the execution module 234 on the basis of two program code parts of the input program code 300. In this case, the first programming language is G code and the second programming language is structured text. The input program code 300 has G character sequences, which are respectively composed in the programming language G code, and ST character sequences, which are respectively composed in the programming language structured text. The G character sequences are included in the first program code component of the input program code 300 and the ST character sequences are included by the second program code component of the input program code 300. The first control sequence 420 for distinguishing between the program code components is the special character "{", the second control sequence 422 is the special character "}", the third control sequence 424 is the special character "!" and the fourth control sequence 426 is the line end.

A first program code part of the input program code 300 is:
"!foo:=555;
G1 X=111+foo Y{bar(222)} M333 M444".
The first program code part comprises a first code line that begins with the third control sequence 424, formed by the special character "!". The third control sequence 424 is followed by a first ST character sequence "foo:=555", which is followed by the fourth control sequence 426, namely the line end. The first program code part furthermore comprises a second code line, which follows the first code line, with a first G character sequence "G1 X=111+foo Y", followed by the first control sequence 424, namely the special character "{", followed by a second ST character sequence "bar(222)", followed by the second control sequence 422, namely the special character "}", followed by a second G character sequence "M333 M444".

The first ST character sequence is an assignment of the numerical value 555 to the ST variable "foo". The ST variable "foo" is declared at a different point in the input program code 300 than a variable of "Int" type, that is to say that the assigned numerical value is of "Int" data type. The first G character sequence, the second ST character sequence and the second G character sequence together represent a derivation of the nonterminal symbol "G code sentence", which derivation comprises a series of five nonterminal symbols "G code word". The G code word "X=100+foo" in second place is represented by the address letter "X" and a value provided by the G expression "100+foo". The character sequence "foo" represents an ST variable and is embedded in the G expression "100+foo" in accordance with the variable embedding rule. The character sequence "100+foo" thus represents a derivation of the nonterminal symbol "G expression" of the first programming language, which comprises a basic symbol "G decimal number" represented by the number 100, a basic symbol "plus operator" represented by the plus sign and the nonterminal symbol "ST variable" represented by "foo".

The G code word "Y{bar(222)}", which is the G code word in third place in the G code sentence formed from the first G character sequence, the second ST character sequence and the second G character sequence, is represented by the address letter "Y" and a value that is provided by the second ST character sequence "bar(222)", which is an ST expression. The second ST character sequence "bar(222)" is a call to a named function having the name "bar" and having a parameter that is provided by the constant numerical value 222. The function "bar", when called, returns a numerical value of "LReal" data type. The second ST character sequence "bar(222)" is embedded in accordance with the second embedding rule into the G code word in third place in the G code sentence. Accordingly, the character sequence "Y{bar(222)}" represents a derivation of the nonterminal symbol "G code word" that comprises the basic symbol "address letter" represented by "Y" and the nonterminal symbol "ST expression" represented by "bar(222)".

During the read-in of the first program code part, the resolution module 212 is first of all in the first state 404, that is to say would convert read-in character sequences into basic symbols of the first programming language G code in accordance with the first basic symbol specification. When the third control sequence 424, formed by the character "!", is read in, the resolution module 212 changes to the third state 408 and converts the first ST character sequence "foo:=555" into basic symbols of the second programming language structured text in accordance with the second basic symbol specification. Consequently, the first ST character sequence is resolved into a basic symbol "ST descriptor" having the content "foo", into a basic symbol "assignment operator" having the content ":=" and into a basic symbol "ST integer" having the content 555.

After the fourth control sequence 426, depicted by the line end, is read in, the resolution module changes back to the first state 404. The first G character sequence is consequently converted into basic symbols of the first programming language G code. In this case, first the basic symbol "address letter" having the content "G", then the basic symbol "G decimal number" having the content 1, then the basic symbol "address letter" having the content "X", then a basic symbol "G assignment" having the content "=", then the basic symbol "G decimal number" having the content "111", then a basic symbol "G plus operator" having the content "+", then the basic symbol "G descriptor" having the content "foo" and finally the basic symbol "address letter" having the content "Y" are produced.

For the subsequent read-in of the first control sequence 420, the resolution module 212 changes from the first state 404 to the second state 406 and converts the following second ST character sequence into basic symbols of the second programming language structured text. In this case, the basic symbol "ST descriptor" having the content "bar", followed by a basic symbol "ST open parentheses" having the content "(", followed by a basic symbol "ST integer" having the content 222, followed by the basic symbol "ST close parentheses" having the content ")" is produced.

For the subsequent read-in of the second control sequence 422, the resolution module 212 changes from the second state 406 back to the first state 404 and converts the following second G character sequence into basic symbols of the first programming language G code. In this case, the basic symbol "address letter" having the content "M", followed by the basic symbol "G decimal number" having the content "333", followed by the basic symbol "address letter" having the content "M", followed by the basic symbol "G decimal number" having the content "444" is produced. The first control sequence 420, the second control sequence 422, the third control sequence 424 and the fourth control sequence 426 are respectively not converted into basic symbols.

The basic symbols "address letter", "G descriptor", "G decimal number" and "G plus operator" are respectively basic symbols of the first programming language G code. The basic symbols "ST descriptor", "ST integer", "assignment operator", "ST open parentheses" and "ST close parentheses" are respectively basic symbols of the second programming language structured text.

A first intermediate representation part produced from the first program code part has a first series of work instructions. The first series of work instructions comprises, as a first work instruction, an instruction that has been produced from the first ST character sequence of the first program code component, comprises a first constant having the numerical value 555 as an attribute and stores the first constant on the runtime stack 510. As a further instruction, the first series of instructions comprises an instruction that removes the numerical value of the first constant from the runtime stack 510 and stores it in the memory 120 at the memory address "address of foo", "address of Foo" being stipulated by the memory allocation module 218 and being an attribute of the instruction object representing the instruction.

As a second work instruction following the first work instruction, the first series comprises an instruction that has been produced on the basis of the first G character sequence of the first program code component, comprises a second constant having the numerical value 1 as an attribute and stores the second constant in the runtime stack 510. As a third work instruction following the second work instruction, the first series comprises an instruction that comprises a third constant having the numerical value 111 as an attribute and stores the third constant in the runtime stack 510.

As a fourth work instruction following the third work instruction, the first series comprises an instruction that loads the numerical value 555 stored at the address "address of foo" from the memory 120 and stores it in the runtime stack 510. As a fifth work instruction following the fourth work instruction, the first series comprises an instruction that converts the topmost data element in the runtime stack 510, namely the integer 555, from the data type "Int" to the data type "LReal". As a sixth work instruction following the fifth work instruction, the first series comprises an instruction that reads in the topmost data element and the next lowest data element below that from the runtime stack 510, adds the two data elements and writes the result of the addition to the runtime stack again as the topmost data element.

As a seventh work instruction following the sixth work instruction, the first series comprises an instruction that comprises a fourth constant having the numerical value 222 as an attribute and stores it in the runtime stack 510. As a eighth work instruction following the seventh work instruction, the first series comprises an instruction that calls the function at the memory address "address of bar" having the topmost data element of the runtime stack 510 as a parameter and stores the return value as the topmost data element in the runtime stack 510. The memory address "address of bar" is stipulated by the memory allocation module 218 during the translation and is an attribute of the eighth instruction. As a ninth work instruction following the eighth work instruction, the first series comprises an instruction that comprises a fifth constant having the numerical value 333 as an attribute and stores it in the runtime stack 510. As a tenth work instruction following the ninth work instruction, the first series comprises an instruction that comprises a sixth constant having the numerical value 444 as an attribute and stores it in the runtime stack 510.

The first work instruction, the seventh work instruction and the eighth work instruction have respectively been created on the basis of the second program code component of the input program code 300, which is composed in the second programming language structured text. The second to sixth work instructions, the ninth work instruction and the tenth work instruction have respectively been produced on the basis of the first program code component composed in the first programming language G code.

As an eleventh work instruction following the tenth work instruction, the series comprises a work instruction that comprises the series of the address letters "G", "X", "Y", "M" and "M" as an attribute. The eleventh work instruction loads the topmost data element and the next lowest four data elements from the runtime stack 510 and respectively forms data pairs for the NC instructions 330 from the address letter "M" and the topmost data element having the numerical value 444, the address letter "M" and the next lowest data element having the numerical value 333, the address letter "Y" and the in turn next lowest data element having the return value of the function call "bar(222)", the address letter "X" and the in turn next lowest data element having the numerical value 111 and the address letter "G" and the in turn next lowest data element having the numerical value 1 and writes the data pairs to the data structure of the NC instructions 330 in the order "G, 1", "X, 111", "Y, [return value of bar (222)]", "M, 333", "M, 444". Finally, the eleventh work instruction comprises a command to transfer the produced data structure of the NC instructions 330 to the NC processor 234.

A second program code part of the input program code 300 is:

```
"{
FOR index := 0 TO 3.1 BY 0.1 DO
    ! G01 X=index Y{SIN(index)+offset_y} F42
```

```
END_FOR
}"
```

The second program code part begins with the first control sequence 420 formed by "1" and comprises a subsequent third ST character sequence "FOR index:=0 TO 3.1 BY 0.1 DO". The third ST character sequence is followed in a new code line by the third control sequence 426, formed by "!", followed by a third G character sequence "G01 X=index Y". After the third G character sequence, the second program code part comprises the first control sequence 420, formed by "{", a fourth ST character sequence "SIN(index)+offset_y", the second control sequence 422, formed by "}", a fourth G character sequence "F42" and the fourth control sequence 426, formed by the line end. Subsequently, the second program code part comprises, in a new program code line, a fifth ST character sequence "END_FOR", in a new code line followed by the second control sequence 422, formed by "}".

The second program code part is a FOR loop in the language structured text. In accordance with the parameter of the FOR loop, the ST variable "index" is incremented from the value 0 to the value 3.1 by 0.1 each time with every pass of the loop. On every pass of the loop, an instruction formed by the third G character sequence, the fourth ST character sequence and the fourth G character sequence is respectively executed, this instruction being a G code sentence in accordance with the first embedding rule. For the execution, the current value of the ST variable "index" is respectively used.

A G code word "X=index" in second place in the G code sentence comprises, in the value in accordance with the variable embedding rule, the ST variable "index", which represents a number. A G code word "Y{SIN(index)+offset_y}" in third place in the G code sentence comprises, as a value in accordance with the second embedding rule, the ST expression "SIN(index)+offset_y", which can be evaluated to form a number.

Accordingly, the second program part represents a derivation of the nonterminal symbol "instruction". The derivation comprises the basic symbol "ST keyword For" represented by "FOR", a derivation of the nonterminal symbol "ST assignment" represented by "index:=0", a basic symbol "ST keyword TO" represented by "TO", a derivation "3.1" of the nonterminal symbol "ST expression", a basic symbol "ST keyword By" represented by "BY", a derivation of the nonterminal symbol "ST expression" represented by "0.1", a basic symbol "ST keyword Do" represented by "DO", a derivation of the nonterminal symbol "instruction" represented by "G01 X=index Y{SIN(index)+offset_y} F42" and a basic symbol "ST keyword End-For" represented by "END_FOR".

The derivation of the nonterminal symbol "instruction" in this case comprises a derivation of the nonterminal symbol "G code sentence" in accordance with the first embedding rule. This derivation of the nonterminal symbol "G code sentence" consists of a series of four derivations of the nonterminal symbol "G code word". The third of these derivations of the nonterminal symbol "G code word" comprises a derivation of the nonterminal symbol "ST expression", represented by "SIN(index)+offset_y", in accordance with the second embedding rule.

The resolution module 212 begins the read-in of the second program code part in the first state 404 and changes, on read-in of the first control sequence 420, formed by the character "{", to the second state 406. In the second state, the resolution module 212 converts the character sequence "FOR index:=0 TO 3 BY 0.1 DO" into basic symbols of the second programming language structured text. After the third control sequence 424, formed by the character "!", is read in, the resolution module 212 changes to the fourth state 410 and converts the character sequence "G01 X=index Y" into basic symbols of the first programming G code.

After the first control sequence 420, formed by the character "{", is read in and up until the second control sequence 422, formed by the character "}", is read in, the resolution module 212 changes to the fifth state 412 and converts the fourth ST character sequence "SIN(index)+offset_y" into basic symbols of the second programming language structured text. The following character sequence "F42" is in turn converted by the resolution module 212 in the fourth state 410 into basic symbols of the first programming language G code. When the fourth control sequence 426, formed by the line end after "F42", is read in, the resolution module 212 outputs the basic symbol "G-Newline" and changes back to the second state 406. In the second state 406, the resolution module 212 converts the character sequence "END_FOR" into basic symbols of the second programming language structured text. When the second control sequence 422 is read in, the resolution module 212 finally changes back to the first state 404.

A second intermediate representation part produced from the second program code part has a second series of work instructions. The second series of work instructions comprises a block of work instructions that is handled on every pass of the FOR loop. The block of work instructions comprises a work instruction that, on every pass, accesses the current value of the ST variable "index" stored in the memory 120 and writes an incremented value of the ST variable "index" to the memory 120. At the end of the block of the work instructions of the FOR loop, there is a work instruction that is configured as a jump instruction and that initiates a jump to a first work instruction at the start of the block. The jump instruction resets the program counter 520 of the execution module 212 to the first work instruction of the block.

Furthermore, the block of the work instructions of the FOR loop comprises work instructions that compute the numerical value of the value of the G code word in third place in the G code sentence with the address letter "Y" by virtue of the ST expression depicted by the fourth ST character sequence being evaluated. In this case, memory access takes place on the memory addresses of the ST variable "index" and the ST variable "offset_y".

For the evaluation of the fourth ST character sequence, the block of the work instructions comprises a work instruction according to which the numerical value of the ST variable "index" is loaded from the memory address of the memory 120 that is associated with this variable. Furthermore, the block comprises work instructions that compute the sine of the numerical value of the ST variable "index" by means of the function "SIN" and that load the numerical value of the variable "offset_y" from the relevant memory address of the memory 120 and add it to the sine.

Finally, the block of the work instructions of the FOR loop comprises work instructions that write the address letter "G" and the value "01", the address letter "X" and the numerical value loaded for the ST variable "index" from the memory 120, the address letter Y and the numerical value obtained during the evaluation of the fourth ST character sequence, and also the address letter "F" and the value "42"

to the date array representing the NC instructions 330. The work instructions for computing the values of the G code words and for describing the data array of the NC instructions 330 are repeated for every pass of the FOR loop.

The control system 1 having the machine controls 200, 201 allows the machines 2, 3 to be controlled by using a control program whose input program code, like the input program code 300, comprises program code components composed both in the first programming language and in the second programming language. As a result, creation of the control program can involve language elements of the first programming language and language elements of the second programming language being mixed with one another.

The production of the uniform intermediate representation by the translation module 210 of the machine control 200 allows a complete syntactic and static-semantic analysis of the whole input program code 300 at the actual loading time for the control program. As a result, it is possible for both errors in the first program code component and errors in the second program code component or errors in the connection of the first to the second program code component to be identified by the processing module 230 before execution of the control program.

A large proportion of the work instructions of the uniform intermediate representation 230 produced from the input program code 300 is converted by the execution module 232 into NC instructions 330 that can in turn be expressed by the first programming language. Hence, the NC processor used for converting the NC instructions 230 into the control commands 334 can be a translator based on the first programming language. The concurrent production of the further control commands 335 by the execution module 232 furthermore allows the machines 2, 3 to be controlled by additionally using movement instructions and supplementary commands that, according to the standard of the first programming language, cannot be depicted by the NC instructions 330.

In particular, the first program code component of the input program code 300 may be composed in the programming language G code and the second program code component may be composed in the programming language structured text. As a result, G code can be extended by language elements that are not available in this language, such as named variables, named functions having formal parameters or control flow instructions from structured text. The shared memory 120 and the shared name space for the variables used in the first and second program code components allow the cross-language use of the variables in the whole input program code 300.

The combination of G code with structured text moreover allows not only the data types that are admissible in G code but also all the data types that are admissible in structured text to be used. As such, for numbers, it is possible to use not only the data type "LReal" provided in G code but also the data types "Int", "Real" or user-defined, restricted data types from structured text. Furthermore, character strings, multi-dimensional arrays, structures, classes, interfaces and pointers that are admissible in structured text can be used.

LIST OF REFERENCE SYMBOLS

1 Control system
2 Machine
3 Further machine
10 User program environment
15 Realtime environment
20 NC core
22 NC channel module
24 Further NC channel module
30 PLC module
40 Interchange channel
50 Data transfer channel
52 Control command channel
54 Further control command channel
56 Status message channel
58 Server control channel
60 Setpoint value channel
62 Further setpoint value channel
100 Server module
110 Server control module
112 Memory access channel
113 Server data channel
114 Control channel
115 Further control channel
120 Memory
122 Shared memory area
124 Local memory area
126 Further local memory area
200 Machine control
201 Further machine control
210 Translation module
212 Resolution module
214 Parser module
216 Analysis module
218 Intermediate representation production module
219 Memory allocation module
230 Processing module
232 Execution module
234 NC processor
236 Sorting module
238 NC core adapter module
300 Input program code
308 Basic symbols
314 Uniform structure tree
320 Intermediate representation
330 NC instruction
332 Status information
334 Control command
335 Further control command
336 Organized control commands
338 Core specific control commands
400 State transition diagram
402 Starting state
404 First state
406 Second state
408 Third state
410 Fourth state
412 Fifth state
420 First control sequence
422 Second control sequence
424 Third control sequence
426 Fourth control sequence
500 Program memory
501 Work instruction
502 First work instruction
510 Runtime stack
511 Data element
512 Topmost data element
520 Program counter
525 Stack pointer

The invention claimed is:
1. A method for operating a translation module for a machine control, wherein the translation module processes an input program code of a control program and produces therefrom a uniform intermediate representation having work instructions for execution by the machine control,
wherein the input program code comprises a first program code component and a second program code component,
wherein the first program code component is written in a first programming language and the second program code component is written in a second programming language,
wherein the work instructions of the intermediate representation comprise a first work instruction and a second work instruction,
wherein the first work instruction is produced on the basis of the first program code component and the second work instruction is produced on the basis of the second program code component, and
wherein the first and second program code components are combined in the uniform intermediate representation as work instructions to be executed sequentially.

2. The method of claim 1,
wherein the translation module comprises a resolution module,
wherein the resolution module reads in the first program code component and the second program code component from the input program code and to converts them into basic symbols,
wherein the resolution module adopts a first state and a second state,
wherein the resolution module in the first state converts the first program code component into basic symbols of the first programming language, and
wherein the resolution module in the second state converts the second program code component into basic symbols of the second programming language.

3. The method of claim 2, wherein the resolution module executes a state transition from the first state to the second state when a first control sequence is read in from the input program code and executes a state transition from the second state to the first state when a second control sequence is read in from the input program code.

4. The method of claim 1,
wherein the translation module comprises a parser module that creates a uniform structure tree of the control program from the basic symbols,
wherein the parser module executes a syntactic check on the input program code on the basis of a combined grammar,
wherein the combined grammar comprises rules of a first grammar of the first programming language and rules of a second grammar of the second programming language, and
wherein the combined grammar comprises an embedding rule, which describes a manner in which basic symbols or nonterminal symbols of the first programming language and basic symbols or nonterminal symbols of the second programming language can be combined with one another.

5. The method of claim 4, wherein the embedding rule describes a derivation of a symbol of the second programming language, in which a symbol of the first programming language is used.

6. The method of claim 5,
wherein the first programming language is G code and the second programming language is structured text, wherein the embedding rule stipulates that a nonterminal symbol "instruction" of the second grammar can be replaced by a nonterminal symbol "G code sentence" formed according to the rules of the first grammar.

7. The method of claim 4, wherein the embedding rule describes a derivation of a symbol of the first programming language, in which a symbol of the second programming language is used.

8. The method of claim 7,
wherein the first programming language is G code and the second programming language is structured text, and
wherein the embedding rule stipulates that a derivation of the nonterminal symbol "G code word" consists of a basic symbol "address letter" and a nonterminal symbol "ST expression" associated with the second programming language.

9. The method of claim 1,
wherein the first programming language is G code and the second programming language is structured text,
wherein the input program code comprises a G code word having an address letter and a value,
wherein the first program code component comprises the address letter and the value, and
wherein the value comprises an ST variable.

10. The method of claim 1,
wherein the translation module comprises an analysis module,
wherein the analysis module executes a semantic check on the input program code on the basis of a combined semantic system, and
wherein the combined semantic system comprises stipulations of a first semantic system of the first programming language and stipulations of a second semantic system of the second programming language.

11. The method of claim 1,
wherein the translation module comprises a memory allocation module, and
wherein the memory allocation module allocates a memory address of a memory of a control system comprising the machine control to a variable included in the input program code.

12. The method of claim 1,
wherein the processing module processes the intermediate representation having the work instructions and takes the work instructions as a basis for producing a control command for controlling a machine connected to the machine control,
wherein the processing module comprises an execution module and a numerical control processor,
wherein the execution module takes the work instructions of the intermediate representation as a basis for producing a numerical control instruction and to transfer the latter to the numerical control processor, and
wherein the numerical control processor takes the numerical control instruction as a basis for producing the control command.

13. The method of claim 12, wherein the execution module produces a further control command for controlling the machine.

14. The method of claim 13,
wherein the processing module comprises a sorting module that receives the control command and the further control command,
wherein the sorting module outputs the control command and the further control command as control commands organized in an order of actuation.

15. The method of claim 12, wherein the execution module receives a piece of status information about a status of the numerical control processor from the numerical control processor.

16. The method of claim 12, wherein the execution module is configured as a stack machine.

17. A method for operating a translation module for a machine control,
wherein the translation module processes an input program code of a control program and produces therefrom a uniform intermediate representation having work instructions for execution by the machine control,
wherein the input program code comprises a first program code component and a second program code component,
wherein the first program code component is written in a first programming language and the second program code component is written in a second programming language,
wherein the work instructions of the intermediate representation comprise a first work instruction and a second work instruction, and
wherein the first work instruction is produced on the basis of the first program code component and the second work instruction is produced on the basis of the second program code component,
wherein the translation module comprises a resolution module,
wherein the resolution module reads in the first program code component and the second program code component from the input program code and converts them into basic symbols,
wherein the resolution module adopts a first state and a second state,
wherein the resolution module in the first state converts the first program code component into basic symbols of the first programming language,
wherein the resolution module in the second state converts the second program code component into basic symbols of the second programming language,
wherein the resolution module executes a state transition from the first state to the second state when a first control sequence is read in from the input program code and executes a state transition from the second state to the first state when a second control sequence is read in from the input program code,
wherein the translation module comprises a parser module that creates a uniform structure tree of the control program from the basic symbols,
wherein the parser module executes a syntactic check on the input program code on the basis of a combined grammar,
wherein the combined grammar comprises rules of a first grammar of the first programming language and rules of a second grammar of the second programming language, and
wherein the combined grammar comprises an embedding rule, which describes a manner in which basic symbols or nonterminal symbols of the first programming language and basic symbols or nonterminal symbols of the second programming language are combined with one another.

18. The method according to claim 17,
wherein the first programming language is G code and the second programming language is structured text, and
wherein the embedding rule stipulates that a non-terminal symbol "instruction" of the second grammar can be replaced by a nonterminal symbol "G code sentence" that is formed according to the rules of the first grammar.

19. The method according to claim 17,
wherein the first programming language is G code and the second programming language is structured text, and
wherein the embedding rule stipulates that a derivation of the nonterminal symbol "G code word" consists of a basic symbol "address letter" of the first programming language and of a nonterminal symbol "ST expression" that is associated with the second programming language.

20. The method according to claim 17, wherein the first programming language is G code and the second programming language is structured text,
wherein the input program code comprises a G code word having an address letter and a value,
wherein the first program code component comprises the address letter and the value, and
wherein the value comprises an ST variable.

* * * * *